(12) United States Patent
Shim et al.

(10) Patent No.: US 11,573,468 B2
(45) Date of Patent: Feb. 7, 2023

(54) DISPLAY SUBSTRATE INCLUDING A MULTI-LAYER STRUCTURE OF AN ORGANIC LAYER AND AN INORGANIC LAYER, DISPLAY DEVICE HAVING THE SAME, AND METHOD OF MANUFACTURING THE DISPLAY SUBSTRATE

(71) Applicant: Samsung Display Co., Ltd., Yongin-Si (KR)

(72) Inventors: SeungBo Shim, Asan-si (KR); Hongmin Yoon, Seoul (KR); Dasom Kang, Asan-si (KR)

(73) Assignee: Samsung Display Co., Ltd.

( * ) Notice: Subject to any disclaimer, the term of this patent is extended or adjusted under 35 U.S.C. 154(b) by 51 days.

(21) Appl. No.: 16/897,191

(22) Filed: Jun. 9, 2020

(65) Prior Publication Data
US 2021/0096433 A1    Apr. 1, 2021

(30) Foreign Application Priority Data
Sep. 26, 2019    (KR) .................. 10-2019-0118540

(51) Int. Cl.
*G02F 1/1362*    (2006.01)
*G02F 1/133*    (2006.01)
*G02F 1/1337*    (2006.01)
*G02F 1/1339*    (2006.01)
*G02F 1/1343*    (2006.01)
(Continued)

(52) U.S. Cl.
CPC ...... *G02F 1/136227* (2013.01); *G02F 1/1337* (2013.01); *G02F 1/1339* (2013.01); *G02F 1/1368* (2013.01); *G02F 1/13306* (2013.01); *G02F 1/13439* (2013.01); *G02F 1/13452* (2013.01); *G02F 1/136222* (2021.01)

(58) Field of Classification Search
CPC combination set(s) only.
See application file for complete search history.

(56) References Cited

U.S. PATENT DOCUMENTS 10,418,582 B2    9/2019   Im et al.
10,446,793 B2    10/2019  Kim et al.
(Continued)

FOREIGN PATENT DOCUMENTS

KR    10-2017-0006050 A    1/2017
KR    10-2017-0024288 A    3/2017
(Continued)

*Primary Examiner* — Lauren Nguyen
(74) *Attorney, Agent, or Firm* — Innovation Counsel LLP

(57) ABSTRACT

A display substrate includes a base substrate and a plurality of insulating layers disposed on a surface of the base substrate. A groove is defined in the insulating layers in a non-display area of the display substrate. An end portion of an alignment layer is disposed in the groove. The groove is capable of controlling a flow of a liquid alignment material to prevent the liquid alignment material from overflowing to an edge of the base substrate. The groove is formed simultaneously in a process of forming contact holes in a display area of the display substrate. Accordingly, a structure corresponding to the end portion of the alignment layer to control the flow of the liquid alignment material is formed without increasing the number of masks.

19 Claims, 18 Drawing Sheets

(51) Int. Cl.
    *G02F 1/1345*       (2006.01)
    *G02F 1/1368*       (2006.01)

(56) References Cited

U.S. PATENT DOCUMENTS

| | | | |
|---|---|---|---|
| 2003/0160921 A1* | 8/2003 | Nakashima | G02F 1/133555 349/113 |
| 2013/0083263 A1* | 4/2013 | Kim | G02F 1/134336 349/38 |
| 2015/0062515 A1 | 3/2015 | Tomioka et al. | |
| 2016/0116772 A1* | 4/2016 | Cha | G02F 1/13394 349/123 |
| 2017/0010500 A1 | 1/2017 | Han | |
| 2017/0017109 A1 | 1/2017 | Park et al. | |
| 2019/0339567 A1 | 11/2019 | Chen | |

FOREIGN PATENT DOCUMENTS

| | | |
|---|---|---|
| KR | 10-2018-0025048 A | 3/2018 |
| KR | 10-2018-0039801 A | 4/2018 |
| KR | 10-2018-0062293 A | 6/2018 |
| WO | 2018/086312 A1 | 5/2018 |

\* cited by examiner

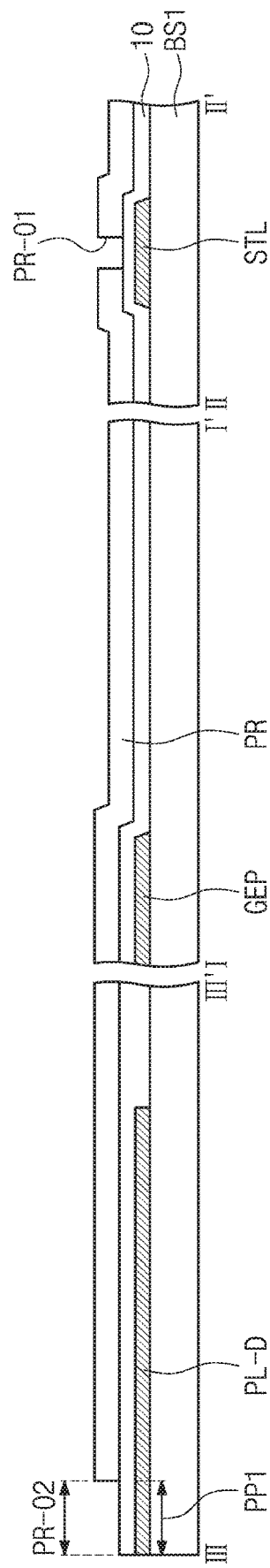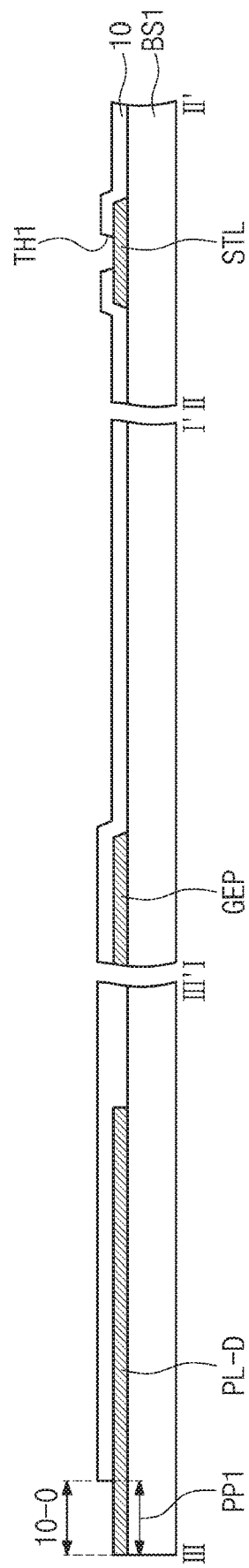

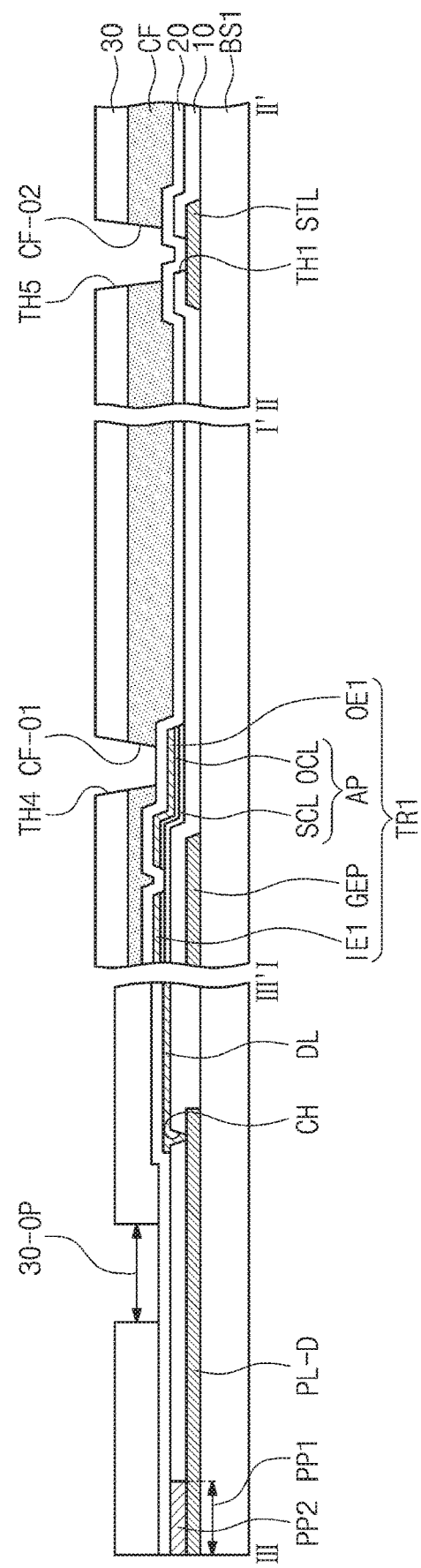

DISPLAY SUBSTRATE INCLUDING A MULTI-LAYER STRUCTURE OF AN ORGANIC LAYER AND AN INORGANIC LAYER, DISPLAY DEVICE HAVING THE SAME, AND METHOD OF MANUFACTURING THE DISPLAY SUBSTRATE

CROSS-REFERENCE TO RELATED APPLICATION

This U.S. non-provisional patent application claims priority under 35 U.S.C. § 119 of Korean Patent Application No. 10-2019-0118540, filed on Sep. 26, 2019, the disclosure of which is hereby incorporated by reference in its entirety.

BACKGROUND

1. Field of Disclosure

The present disclosure relates to a display substrate, a display device having the same, and a method of manufacturing the display substrate. More particularly, the present disclosure relates to a display substrate including a multi-layer structure of an organic layer and an inorganic layer, a display device having the display substrate, and a method of manufacturing the display substrate to simplify a manufacturing process of the display substrate.

2. Description of the Related Art

In general, a circuit board is connected to a display panel after the display panel is manufactured. For instance, a tape automated bonding (TAB) mounting technique is used to bond the circuit board to the display panel using an anisotropic conductive film.

In recent years, various designs of the display panel to reduce a bezel area (or a non-display area) have been researched and widely adopted.

SUMMARY

The present disclosure provides a display substrate capable of controlling a placement of an end portion of an alignment layer in a non-display area.

The present disclosure provides a display device including a slim bezel area.

The present disclosure provides a method of manufacturing a display substrate that is capable of controlling the placement of the end portion of the alignment layer without increasing the number of masks.

Embodiments of the inventive concept provide a display substrate including a base substrate including a display area and a non-display area, a pixel electrode disposed on the base substrate to overlap the display area, a first transistor connected to the pixel electrode and including an input part, an output part, and a control part, a signal pad disposed on the base substrate, overlapping the non-display area, and including a first pad and a second pad disposed on the first pad, a connection structure including a first conductive pattern that is disposed on a same layer as the control part and a second conductive pattern that is disposed on a same layer as the pixel electrode, a first inorganic layer disposed on the control part comprising a first through hole that exposes the first conductive pattern, and the first inorganic layer exposing the signal pad, a second inorganic layer disposed on the first inorganic layer, covering the input part, the output part, and the signal pad, and comprising a second through hole that exposes at least a portion of the output part and a third through hole that corresponds to the first through hole, an organic layer disposed on the second inorganic layer and comprising a first opening that overlaps the non-display area, a fourth through hole that corresponds to the second through hole, and a fifth through hole that corresponds to the third through hole, and an alignment layer covering the pixel electrode and the second conductive pattern and partially disposed in the first opening. The pixel electrode is connected to the output part through the second through hole and the fourth through hole, and the second conductive pattern is connected to the first conductive pattern through the first through hole, the third through hole, and the fifth through hole.

The second inorganic layer may include a second opening that corresponds to the first opening.

The first opening and the second opening may extend along an edge of the display substrate.

The display substrate may further include a color filter disposed between the second inorganic layer and the organic layer and overlapping the pixel electrode. The color filter may include a sixth through hole that corresponds to the fourth through hole and a seventh through hole that corresponds to the fifth through hole.

The organic layer may cover an inner side surface area of the color filter that correspond to the sixth through hole.

The first pad may correspond to a portion of a signal line that is connected to the first transistor.

The display substrate may further include a second transistor connecting the first transistor to the connection structure and a third transistor connected to the first transistor. The first transistor and the third transistor may be connected to the signal line, the pixel electrode may include a first sub-electrode connected to the first transistor and a second sub-electrode connected to the third transistor, and the first conductive pattern may receive a storage voltage.

The organic layer may expose a portion of an upper surface of the second inorganic layer that corresponds to the fourth through hole.

The organic layer may expose a portion of an upper surface of the second inorganic layer that corresponds to the fifth through hole.

The second inorganic layer may cover an inner side surface area of the first inorganic layer that corresponds to the first through hole.

The second inorganic layer may expose a portion of an upper surface of the first inorganic layer that corresponds to the third through hole.

The display substrate may further includes a driving circuit disposed on the base substrate and overlapping the non-display area, and the connection structure may correspond to a portion of the driving circuit.

Embodiments of the inventive concept provide a display device including a first display substrate, a connection pad disposed on a side surface of the first display substrate, and a circuit board coupled to the connection pad. The first display substrate includes a first base substrate including a display area and a non-display area, a pixel electrode disposed on the first base substrate to overlap the display area, a transistor connected to the pixel electrode and including an input part, an output part, and a control part, a signal pad disposed on the first base substrate, overlapping the non-display area, including a first pad and a second pad disposed on the first pad, and connected to the connection pad, a connection structure including a first conductive pattern that is disposed on a same layer as the control part and a second conductive pattern that is disposed on a same layer as the pixel electrode, a first inorganic layer disposed on the control electrode including a first through hole that exposes at least a portion of the first conductive pattern, and the first inorganic layer further exposing the signal pad, a second inorganic layer disposed on the first inorganic layer, covering the input part, the output part, and the signal pad, and including a second through hole that exposes at least a portion of the output part and a third through hole that corresponds to the first through hole, an organic layer disposed on the second inorganic layer and including a fourth through hole that corresponds to the second through hole, and a fifth through hole that corresponds to the third through hole, and an alignment layer covering the pixel electrode and the second conductive pattern. A groove removed at least a portion of the organic layer is defined in the non-display area of the first display substrate, a portion of the alignment layer is disposed in the groove, the pixel electrode is connected to the output part through the second through hole and the fourth through hole, and the second conductive pattern is connected to the first conductive pattern through the first through hole, the third through hole, and the fifth through hole.

The groove may be extended a portion of the second inorganic layer to expose at least a portion of the first inorganic layer.

The display device may further include a second display substrate facing the first display substrate. The second display substrate may include a second base substrate and a common electrode disposed on the second base substrate.

The display device may further include a color filter disposed on the first base substrate or the second base substrate.

The color filter may be disposed between the second base substrate and the common electrode.

The display device may further include a second display substrate facing the first display substrate and a sealant coupling the first display substrate and the second display substrate. The sealant may overlap the groove.

A portion of the organic layer that overlaps the pixel electrode may be disposed on the second inorganic layer.

Embodiments of the inventive concept provide a method of manufacturing a display substrate including providing a base substrate including a display area and a non-display area, forming a first pad in the non-display area and a gate electrode and a first conductive pattern in the display area, forming a first inorganic layer on the base substrate, the first inorganic layer comprising a first through hole that exposes the first pad and the first conductive pattern, forming a second pad on the first pad and an electrode on the gate electrode, forming a second inorganic layer that covers the second pad and the electrode, forming an organic layer on the second inorganic layer, performing a photolithography process on the organic layer to form a first opening in the non-display area, a second through hole that exposes at least a portion of the second inorganic layer and overlapping the electrode, and a third through hole that exposes at least a portion of the second inorganic layer and overlapping the second conductive pattern, etching the second inorganic layer to form a second opening corresponding to the first opening, a fourth through hole corresponding to the second through hole, and a fifth through hole corresponding to the third through hole, forming a pixel electrode connected to the electrode and a second conductive pattern that is connected to the first conductive pattern on the organic layer, and forming an alignment layer on the organic layer to cover the pixel electrode and the second conductive pattern, the alignment layer being partially disposed in the first opening and the second opening.

According to the above, since the end portion of the alignment layer is disposed in the opening inside the groove, an overlapping area of the sealant and the alignment layer may be reduced, and the coupling strength between the sealant and the display substrate increases. The coupling strength between the sealant and the display substrate may be achieved while providing a narrow non-display area.

The groove may be formed during the patterning process of forming the organic layer and/or the inorganic layer. In this case, no separate masks may be used to form the groove. Thus, the manufacturing process is simplified, and the manufacturing time is shortened.

BRIEF DESCRIPTION OF THE DRAWINGS

The above and other advantages of the present disclosure will become readily apparent by reference to the following detailed description when considered in conjunction with the accompanying drawings wherein:

FIGS. 7A, 7B, 7C, 7D, 7E, 7F, and 7G are cross-sectional views showing a method of manufacturing a display substrate according to an exemplary embodiment of the present disclosure;

DETAILED DESCRIPTION

Figure 1:
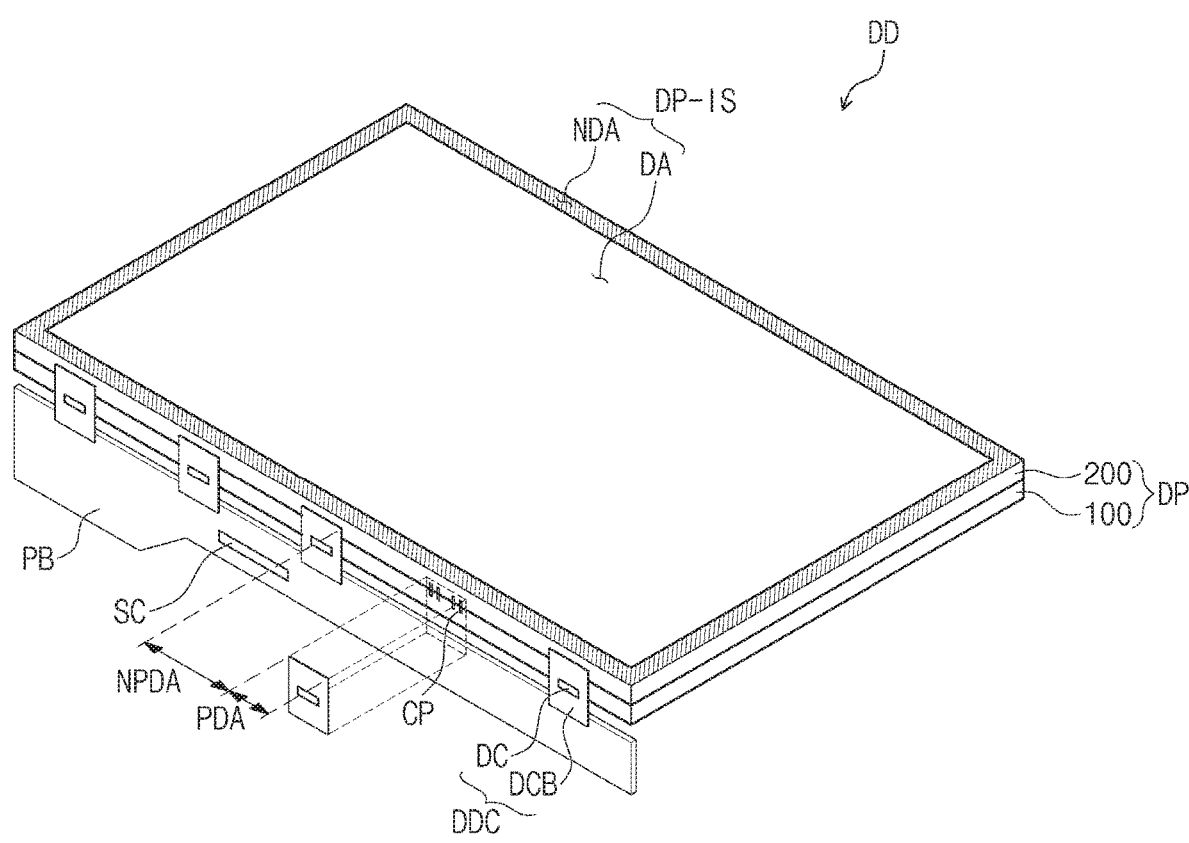
FIG. 1 is a perspective view showing a display device according to an exemplary embodiment of the present disclosure.
Figure 1:
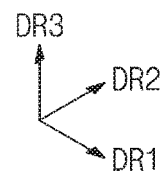

In the following descriptions, it will be understood that when an element or layer is referred to as being "on", "connected to," or "coupled to" another element or layer, it can be directly on, connected or coupled to the other element or layer, or one or more intervening elements or layers may be present.

Like numerals refer to like elements throughout the present disclosure. In the drawings, the thickness, ratio, and dimension of components are exaggerated for effective illustration of the components. As used herein, the term "and/or" includes any and all combinations of one or more of the associated listed items.

It will be understood that, although the terms first, second, etc. may be used herein to describe various elements, components, regions, layers, and/or sections, these elements, those components, regions, layers, and/or sections should not be limited by these terms. These terms are used to distinguish one element, component, region, layer, or section from another region, layer, or section. Thus, a first element, component, region, layer, or section discussed below could be termed a second element, component, region, layer, or section without departing from the teachings of the present disclosure. As used herein, the singular forms, "a", "an" and "the" are intended to include the plural forms as well, unless the context clearly indicates otherwise.

Spatially relative terms, such as "beneath", "below," "lower," "above," "upper," and the like, may be used herein for ease of description to describe one element or feature's relationship to another element(s) or feature(s) as illustrated in the figures.

It will be further understood that the terms "includes" and/or "including", when used in the present disclosure, specify the presence of stated features, integers, steps, operations, elements, and/or components, but do not preclude the presence or addition of one or more other features, integers, steps, operations, elements, components, and/or groups thereof.

Unless otherwise defined, terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

Figure 2:
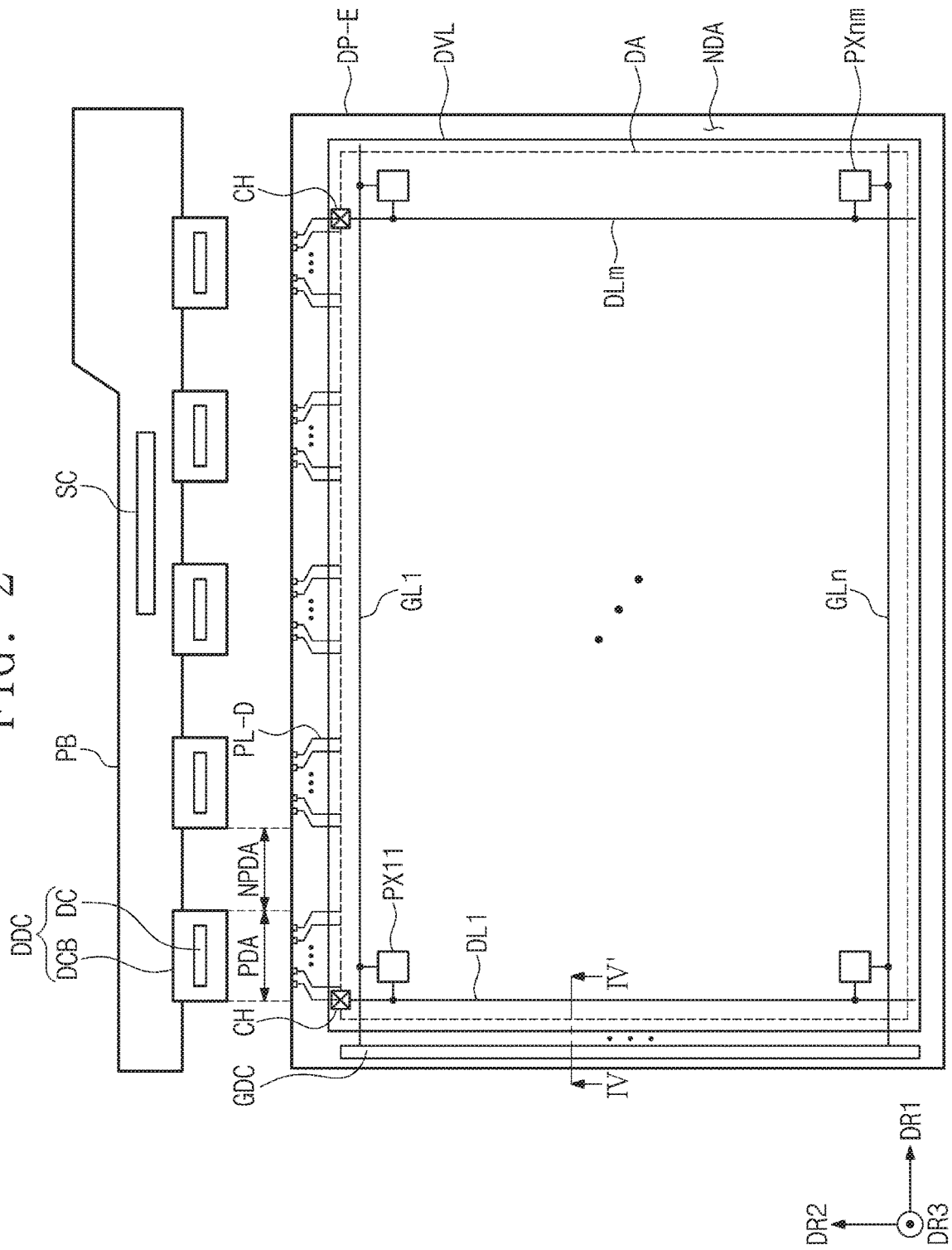
FIG. 2 is a plan view showing a display device according to an exemplary embodiment of the present disclosure.

FIG. 1 is a perspective view showing a display device DD according to an exemplary embodiment of the present disclosure. FIG. 2 is a plan view showing the display device DD according to an exemplary embodiment of the present disclosure.

Referring to FIGS. 1 and 2, the display device DD includes a display panel DP, a data driving unit DDC, a main circuit board PB, a gate driving circuit GDC, and a signal control circuit SC. The data driving unit DDC may be provided in a plural number. The gate driving circuit GDC may be provided in a plural number. Although not shown in figures, the display device DD may further include a chassis member or a molding member and may further include a backlight unit depending on the type of the display panel DP.

The display panel DP may be, but not limited to, a liquid crystal display panel, a plasma display panel, an electrophoretic display panel, a microelectromechanical system (MEMS) display panel, and an organic light emitting display panel.

The display panel DP may include a first display substrate 100 and a second display substrate 200 facing the first display substrate 100 and spaced apart from the first display substrate 100. A predetermined cell gap may be defined between the first display substrate 100 and the second display substrate 200. A grayscale display layer (not shown) may be disposed between the first display substrate 100 and the second display substrate 200 to generate an image. The grayscale display layer may be a display element layer, such as a liquid crystal layer, an organic light emitting layer, or an electrophoretic layer, depending on the type of the display panel DP.

As shown in FIG. 1, the display panel DP may display the image through a display surface DP-IS. The display surface DP-IS may be substantially parallel to a surface defined by a first directional axis DR1 and a second directional axis DR2. The display surface DP-IS may include a display area DA and a non-display area NDA. The non-display area NDA may be defined along an edge DP-E of the display surface DP-IS and may surround the display area DA.

A third directional axis DR3 may indicate a normal direction of the display surface DP-IS, e.g., a thickness direction of the display panel DP. Front (or upper) and rear (or lower) surfaces of each layer or unit described hereinafter may be distinguished from each other along the third directional axis DR3. However, the first, second, and third directional axes DR1, DR2, and DR3 shown in the present exemplary embodiment are merely exemplary. Hereinafter, the first, second, and third directions are directions respectively represented by the first, second, and third directional axes DR1, DR2, and DR3 and are assigned with the same reference numerals.

In the exemplary embodiment of the present disclosure, the display panel DP including a flat display surface is shown, however, it should not be limited thereto or thereby. The display device DD may include a curved display surface or a three-dimensional display surface. The three-dimensional display surface may include a plurality of display areas facing one another in various directions.

The data driving unit DDC may include a circuit board DCB and a driving chip DC. The circuit board DCB may have a structure in which an insulating layer and a conductive layer are stacked one another. The conductive layer may include a plurality of signal lines such as gate lines, data lines, and auxiliary signal lines. The data driving unit DDC may be coupled to a side surface of the display panel DP to be electrically connected to the signal lines of the display panel DP. As the data driving unit DDC is coupled to the side surface of the display panel DP, the non-display area NDA of the display panel DP may be reduced.

Referring to FIG. 1, the data driving unit DDC is shown as being separated from the side surface of the display panel DP. A connection pad CP is disposed on the side surface of the display panel DP that is connected to the data driving unit DDC.

The connection pad CP may be provided in a plural number to correspond to a pad or a terminal (not shown) of the circuit board DCB. The connection pads CP may be arranged in the first direction DR1 to be spaced apart from each other. The connection pad CP may be connected to the pad or the terminal of the circuit board DCB. The connection pad CP may include a metal paste. The metal paste may include a mixture of a metal and an insulating material. For example, the connection pad CP may be a silver paste.

The side surface or the edge DP-E of the display panel DP to which the data driving unit DDC is connected may include pad areas PDA and non-pad areas NPDA except for the pad areas PDA. The data driving unit DDC is connected to the pad areas PDA. End portions of the auxiliary signal lines PL-D (refer to FIG. 6A) may be disposed in the pad areas PDA.

The main circuit board PB may be connected to the circuit board DCB of the data driving unit DDC. The main circuit board PB may be electrically connected to the circuit board DCB of the data driving unit DDC using an anisotropic conductive film or a solder ball. The signal control circuit SC may be mounted on the main circuit board PB. The signal control circuit SC may receive image data and control signals from an external apparatus (not shown) such as a graphics controller. The signal control circuit SC may provide a control signal to the data driving unit DDC. In an exemplary embodiment of the present disclosure, the driving chip DC of the data driving unit DDC may be mounted on the main circuit board PB.

Referring to FIG. 2, the display panel DP includes a plurality of pixels PX11 to PXnm and a plurality of signal lines including, but not limited to, a plurality of gate lines GL1 to GLn, a plurality of data lines DL1 to DLm, and a plurality of auxiliary signal lines PL-D.

The gate lines GL1 to GLn extend in the first direction DR1 and are arranged in the second direction DR2, and the data lines DL1 to DLm are insulated from the gate lines GL1 to GLn while crossing the gate lines GL1 to GLn. The gate lines GL1 to GLn and the data lines DL1 to DLm are disposed to overlap the display area DA.

The gate lines GL1 to GLn are connected to the gate driving circuit GDC. The gate driving circuit GDC may be disposed at one side of the display panel DP, however, in some embodiments, the gate driving circuit GDC may be disposed at both sides of the display panel DP in the first direction DR1 or at least two or more sides of the display panel DP.

In the present exemplary embodiment, the gate driving circuit GDC may be integrated in the display panel DP through an oxide silicon gate (OSG) driver circuit process or an amorphous silicon gate (ASG) driver circuit process. In the present exemplary embodiment, the gate driving circuit GDC may be implemented in a similar manner as that of the data driving unit DDC. The gate driving circuit GDC including a circuit board and a driving chip may be coupled to one side of the display panel DP.

The auxiliary signal lines PL-D may be disposed to overlap the non-display area NDA and may be connected to the data lines DL1 to DLm. The auxiliary signal lines PL-D that are connected to the data lines DL1 to DLm may be disposed in a layer that is different from a layer on which the data lines DL1 to DLm are disposed. The data lines DL1 to DLm may be electrically connected to the corresponding auxiliary signal lines PL-D through contact holes CH that penetrates through at least one insulating layer disposed between the data lines DL1 to DLm and the auxiliary signal lines PL-D. FIG. 2 shows two contact holes CH as a representative example.

In the present exemplary embodiment, the auxiliary signal lines PL-D and corresponding signal lines (e.g., the data lines DL1 to DLm) are disposed in different layers from each other, however, they should not be limited thereto or thereby. Each signal line may be disposed to overlap the non-display area NDA and the display area DA, and may have an integral shape. In some embodiments, these signal lines may be defined as an integrated signal line and may be disposed in the same layer as the auxiliary signal lines PL-D.

In addition to the gate lines GL1 to GLn, the data lines DL1 to DLm, and the auxiliary signal lines PL-D, the signal lines may further include other signal lines. For instance, the signal lines may further include a power supply line DVL. The power supply line DVL may receive a DC voltage. The DC voltage may be a ground voltage. The power supply line DVL may be disposed to overlap the non-display area NDA and may be disposed in the same layer as the data lines DL1 to DLm. The power supply line DVL may have a closed-line shape or an open-loop shape. The power supply line DVL may include portions disposed in layers different from each other. In addition, the signal lines may further include a signal line that connects the gate driving circuit GDC and the main circuit board PB.

Each of the pixels PX11 to PXnm may be connected to a corresponding gate line among the gate lines GL1 to GLn and a corresponding data line among the data lines DL1 to DLm. Each of the pixels PX11 to PXnm may include a pixel driving circuit and a display element. In the present exemplary embodiment, the pixels PX11 to PXnm are arranged in a matrix form in a plan view, however, the arrangement of the pixels PX11 to PXnm should not be limited to the matrix form. For example, the pixels PX11 to PXnm may be arranged in a pentile form.

Figure 3:
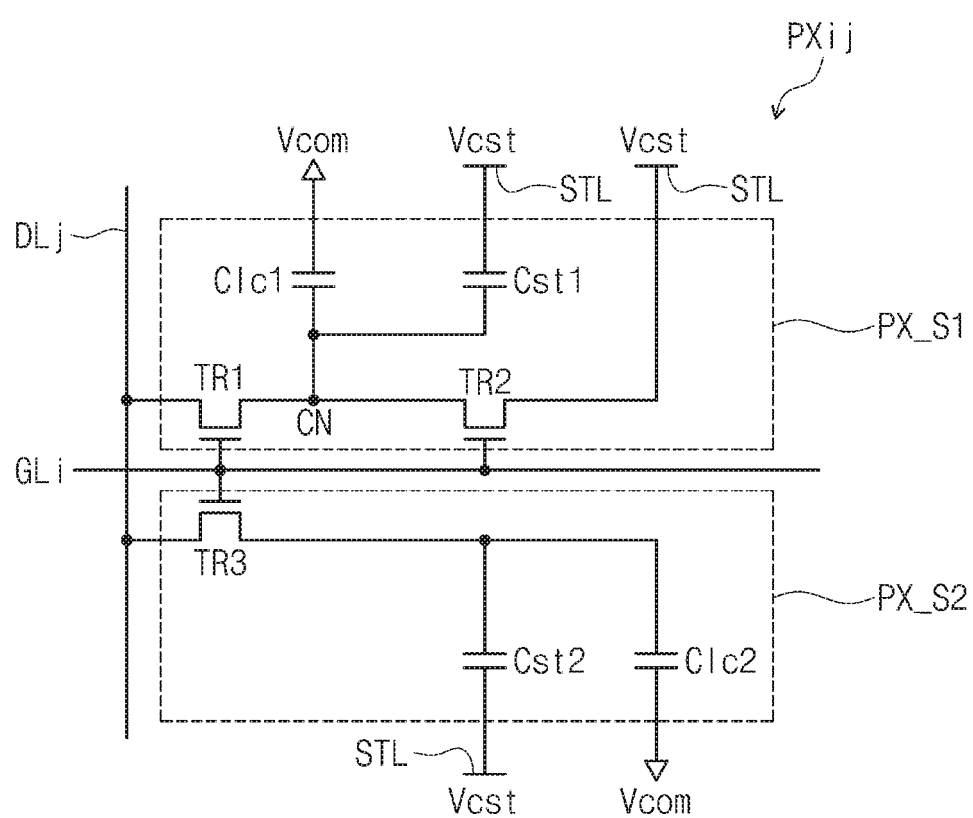
FIG. 3 is an equivalent circuit diagram showing a pixel according to an exemplary embodiment of the present disclosure.

FIG. 3 is an equivalent circuit diagram showing a pixel PXij according to an exemplary embodiment of the present disclosure. The pixel PXij is connected to an i-th gate line GLi and a j-th data line DLj as a representative example. Hereinafter, a liquid crystal display panel will be described as an example of the display panel DP.

In FIG. 3, the equivalent circuit diagram is shown with respect to one pixel PXij among the pixels PX11 to PXnm shown in FIG. 2, and the pixels PX11 to PXnm shown in FIG. 2 may have the same circuit configuration.

The pixel PXij may include a first sub-pixel PX_S1 and a second sub-pixel PX_S2. The pixel PXij including the two sub-pixels PX_S1 and PX_S2 may have an improved side visibility.

The first sub-pixel PX_S1 may include a first transistor TR1, a second transistor TR2, a first liquid crystal capacitor Clc1, and a first storage capacitor Cst1. The second sub-pixel PX_S2 may include a third transistor TR3, a second liquid crystal capacitor Clc2, and a second storage capacitor Cst2.

A control part (e.g., a control electrode or a gate part) of the first transistor TR1 is connected to the i-th gate line GLi, an input part (e.g., an input electrode or a drain part) of the first transistor TR1 is connected to the j-th data line DLj, and an output part (e.g., an output electrode or a source part) of the first transistor TR1 is connected to the first liquid crystal capacitor Clc1 and the first storage capacitor Cst1.

A first electrode of the first liquid crystal capacitor Clc1 is connected to the output electrode of the first transistor TR1, and a second electrode of the first liquid crystal capacitor Clc1 receives a common voltage Vcom. A first electrode of the first storage capacitor Cst1 is connected to the output electrode of the first transistor TR1, and a second electrode of the first storage capacitor Cst1 receives a storage voltage Vcst. A control electrode of the second transistor TR2 is connected to the i-th gate line GLi, an input electrode of the second transistor TR2 receives the storage voltage Vcst, and an output electrode of the second transistor TR2 is connected to the output electrode of the first transistor TR1.

A control electrode of the third transistor TR3 is connected to the i-th gate line GLi, an input electrode of the third transistor TR3 is connected to the j-th data line DLj, and an output electrode of the third transistor TR3 is connected to the second liquid crystal capacitor Clc2 and the second storage capacitor Cst2.

A first electrode of the second liquid crystal capacitor Clc2 is connected to the output electrode of the third transistor TR3, and a second electrode of the second liquid crystal capacitor Clc2 receives the common voltage Vcom. A first electrode of the second storage capacitor Cst2 is connected to the output electrode of the third transistor TR3, and a second electrode of the second storage capacitor Cst2 receives the storage voltage Vcst. The storage voltage Vcst may have substantially the same voltage level as the common voltage Vcom.

The first, second, and third transistors TR1, TR2, and TR3 may be substantially simultaneously turned on in response to a gate signal provided thereto through the i-th gate line GLi. A data voltage of the j-th data line DLj is provided to the first sub-pixel PX_S1 through the turned-on first transistor TR1. In addition, the storage voltage Vcst is provided to the first sub-pixel PX_S1 through the turned-on second transistor TR2.

A voltage (hereinafter, referred to as a "distribution voltage") at a contact node CN where the first transistor TR1 and the second transistor TR2 are connected has a value divided according to a ratio of resistance values when each of the first and second transistors TR1 and TR2 is turned on. That is, the distribution voltage has the value between the data voltage provided through the turned-on first transistor TR1 and the storage voltage Vcst provided through the turned-on second transistor TR2.

Accordingly, the first liquid crystal capacitor Clc1 is charged with a first pixel voltage corresponding to a difference in a voltage level between the distribution voltage and the common voltage Vcom. An alignment of liquid crystal directors included in a liquid crystal layer is changed in accordance with an amount of electric charges charged in the first liquid crystal capacitor Clc1. A light incident to the liquid crystal layer transmits through, reflects, or is blocked by the alignment of the liquid crystal directors. The first storage capacitor Cst1 is connected to the first liquid crystal capacitor Clc1 in parallel to maintain the alignment of the liquid crystal directors for a predetermined period.

The data voltage of the j-th data line DLj is provided to the second sub-pixel PX_S2 through the turned-on second transistor TR2. The second liquid crystal capacitor Clc2 is charged with a second pixel voltage corresponding to a difference in a voltage level between the data voltage and the common voltage Vcom. The alignment of the liquid crystal directors included in the liquid crystal layer is changed in accordance with an amount of electric charges charged in the second liquid crystal capacitor Clc2. The light incident to the liquid crystal layer transmits through, reflects, or is blocked by the alignment of the liquid crystal directors. The second storage capacitor Cst2 is connected to the second liquid crystal capacitor Clc2 in parallel to maintain the alignment of the liquid crystal directors for a predetermined period.

Due to the voltage distribution caused by the second transistor TR2, the first pixel voltage charged in the first liquid crystal capacitor Clc1 and the second pixel voltage charged in the second liquid crystal capacitor Clc2 may have different voltage levels from each other. In the present exemplary embodiment, the first pixel voltage has a voltage level smaller than that of the second pixel voltage. As described above, due to the difference between the first and second pixel voltages, a grayscale displayed through the first sub-pixel PX_S1 may be different from a grayscale displayed through the second sub-pixel PX_S2.

Figure 4:
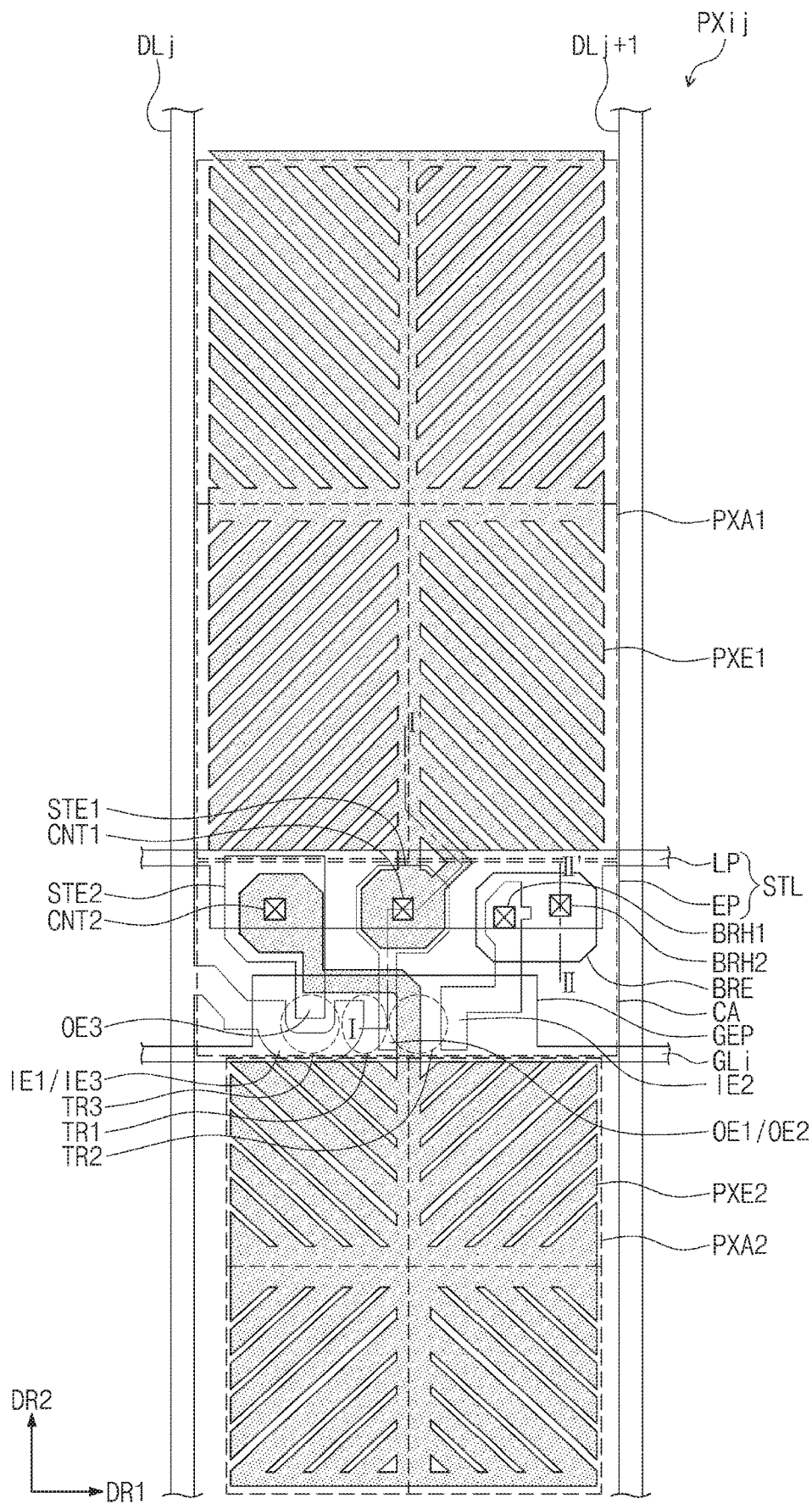
FIG. 4 is a plan view showing a pixel according to an exemplary embodiment of the present disclosure.
Figure 5A:
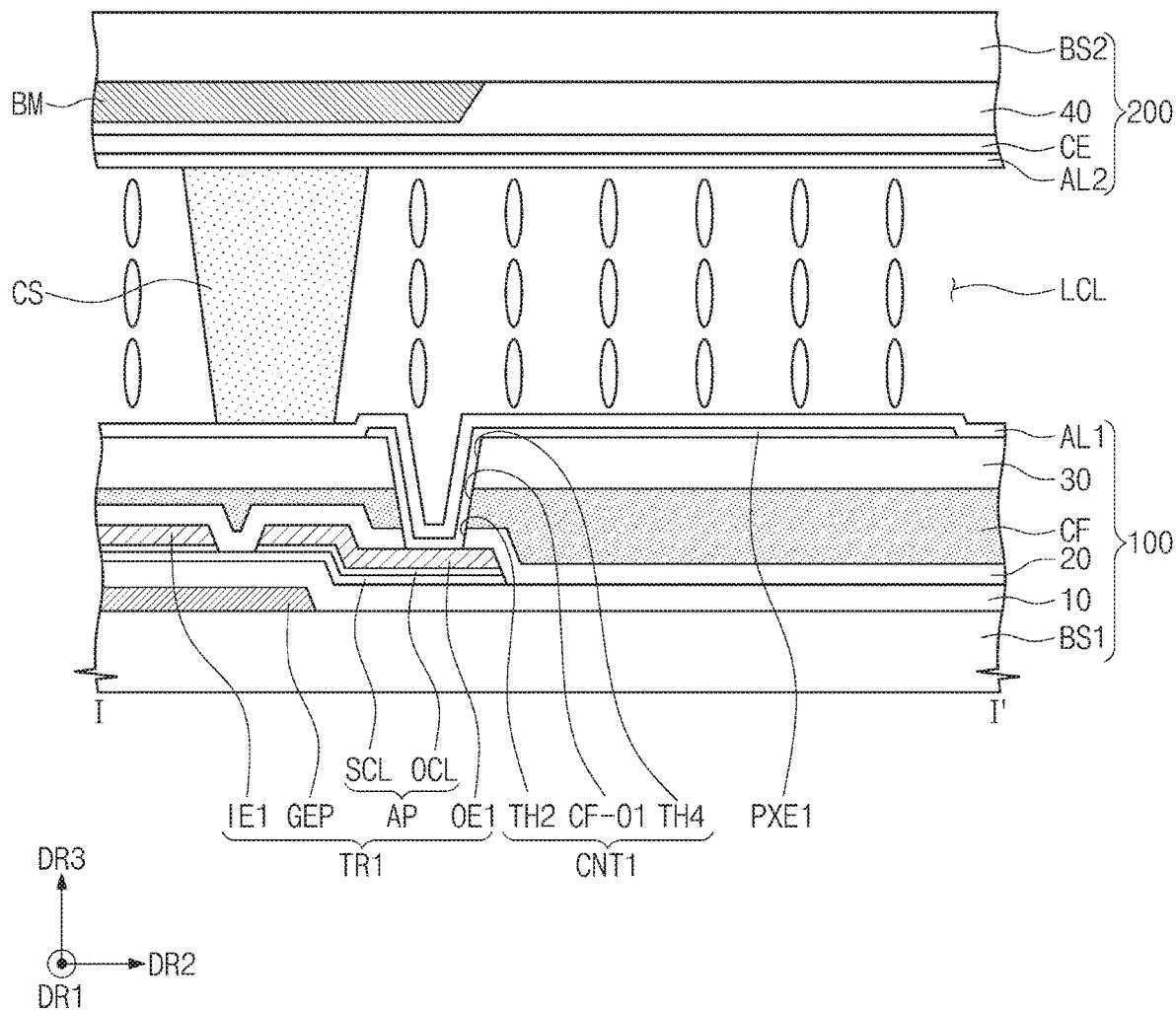
FIG. 5A is a cross-sectional view taken along a line I-I' of FIG. 4.
Figure 5B:
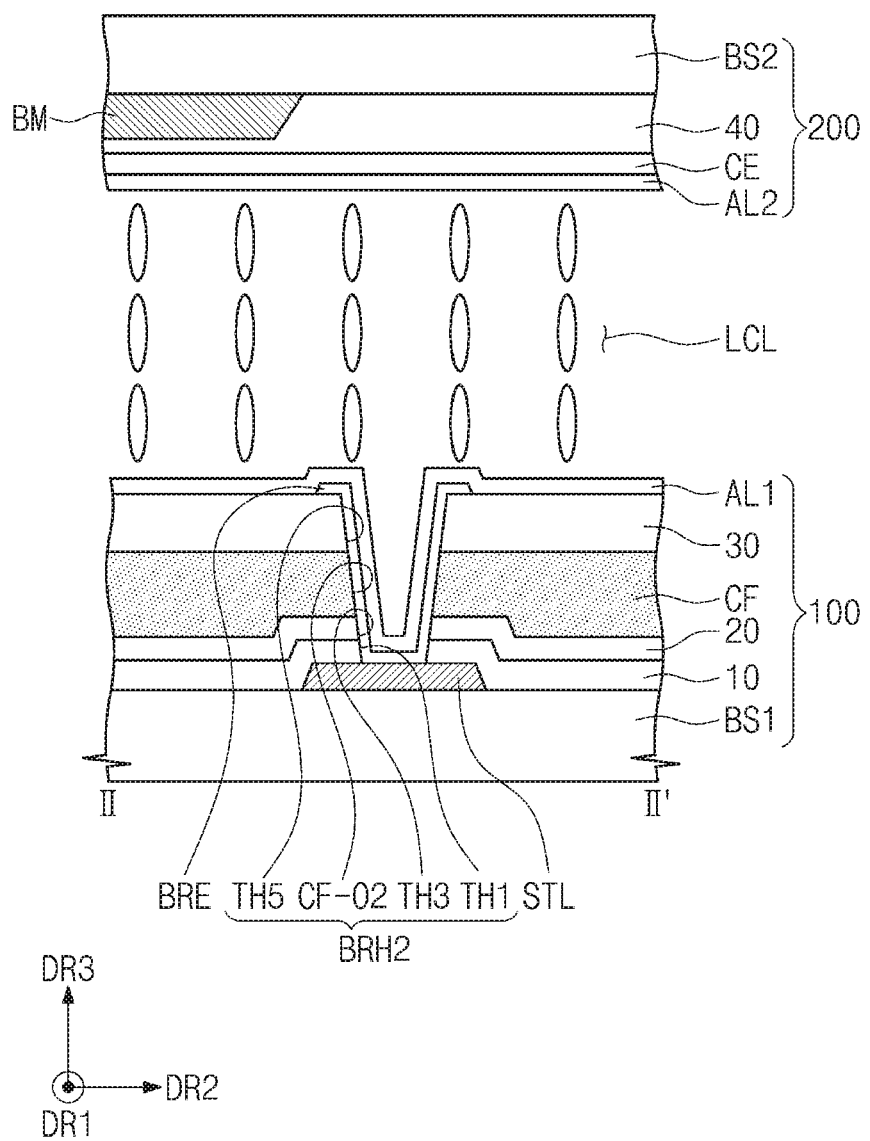
FIG. 5B is a cross-sectional view taken along a line II-II' of FIG. 4.

FIG. 4 is a plan view showing the pixel PXij according to an exemplary embodiment of the present disclosure, FIG. 5A is a cross-sectional view taken along a line I-I' of FIG. 4, and FIG. 5B is a cross-sectional view taken along a line II-II' of FIG. 4. Hereinafter, the pixel PXij will be described with reference to FIGS. 3, 4, 5A, and 5B.

Referring to FIGS. 3 and 4, the pixel PXij is disposed in a first electrode area PXA1, a second electrode area PXA2, and a circuit area CA. The first electrode area PXA1 and the second electrode area PXA2 are arranged in the second direction DR2, and the circuit area CA is disposed between the first and second electrode areas PXA1 and PXA2.

A first pixel electrode PXE1 is disposed in the first electrode area PXA1, and a second pixel electrode PXE2 is disposed in the second electrode area PXA2. The first pixel electrode PXE1 may correspond to the first electrode of the first liquid crystal capacitor Clc1, and the second pixel electrode PXE2 may correspond to the first electrode of the second liquid crystal capacitor Clc2.

The first transistor TR1, the second transistor TR2, a structure of the first storage capacitor Cst1, the third transistor TR3, and a structure of the second storage capacitor Cst2 are disposed in the circuit area CA.

The first transistor TR1 includes a first control electrode, a first input electrode IE1, and a first output electrode OE1. The first control electrode of the first transistor TR1 may correspond to a portion of a gate electrode portion GEP that is branched from the i-th gate line GLi. The i-th gate line GLi and the gate electrode portion GEP are disposed in the circuit area CA. The first input electrode IE1 is electrically connected to the j-th data line DLj to receive the data voltage. The first input electrode IE1 is branched from the j-th data line DLj.

A storage line STL that is spaced apart from the i-th gate line GLi in the second direction DR2 is disposed in the circuit area CA. The storage line STL includes a line portion LP and an electrode portion EP extending from the line portion LP.

A first storage electrode STE1 extending from the first output electrode OE1 overlaps the storage line STL. The storage line STL receives the storage voltage Vcst, and the first storage electrode STE1 faces the storage line STL to form the first storage capacitor Cst1.

The first storage electrode STE1 is disposed to overlap the first pixel electrode PXE1 and electrically connected to the first pixel electrode PXE1 through a first contact hole CNT1. Consequently, the first output electrode OE1 is electrically connected to the first pixel electrode PXE1 through the first storage electrode STE1 and the first contact hole CNT1.

The second transistor TR2 includes a second control electrode, a second input electrode IE2, and a second output electrode OE2. The second control electrode of the second transistor TR2 may correspond to a portion of the gate electrode portion GEP. The second input electrode IE2 is electrically connected to the storage line STL, and the second output electrode OE2 is electrically connected to the first output electrode OE1 of the first transistor TR1.

A bridge electrode BRE is disposed to connect the second transistor TR2 and the storage line STL. The bridge electrode BRE overlaps the second input electrode IE2 and the storage line STL. The bridge electrode BRE is connected to the second input electrode IE2 through a first bridge hole BRH1 and connected to the storage line STL through a second bridge hole BRH2. Therefore, the second input electrode IE2 is electrically connected to the storage line STL through the bridge electrode BRE. Consequently, the second transistor TR2 receives the storage voltage Vcst through the bridge electrode BRE.

The third transistor TR3 includes a third control electrode, a third input electrode IE3, and a third output electrode OE3. The third control electrode of the third transistor TR3 may correspond to a portion of the gate electrode portion GEP that is branched from the i-th gate line GLi. The i-th gate line GLi and the gate electrode portion GEP may have substantially the same stacked structure. The third input electrode IE3 is electrically connected to the j-th data line DLj to receive the data voltage. The third input electrode IE3 is branched from the j-th data line DLj.

The second storage electrode STE2 extends from the third output electrode OE3. The second storage electrode STE2 overlaps the storage line STL to form the second storage capacitor Cst2. In addition, the second storage electrode STE2 overlaps the second pixel electrode PXE2 and is electrically connected to the first pixel electrode PXE1 through a second contact hole CNT2. The third output electrode OE3 is electrically connected to the second pixel electrode PXE2 through the second storage electrode STE2 and the second contact hole CNT2.

In the present exemplary embodiment, the first output electrode OE1 and the second output electrode OE2 are integrally formed with each other, however, they should not be limited thereto or thereby. In addition, the first and third input electrodes IE1 and IE3 are integrally formed with each other, however, they should not be limited thereto or thereby.

The control electrodes of the first to third transistors TR1 to TR3 are integrally formed with each other, however, they should not be limited thereto or thereby.

Referring to FIGS. 5A and 5B, the gate electrode portion GEP and the storage line STL may be disposed on one surface of a first base substrate BS1. The gate electrode portion GEP and the storage line STL may include a metal, such as aluminum (Al), silver (Ag), copper (Cu), molybdenum (Mo), chromium (Cr), tantalum (Ta), or titanium (Ti), or an alloy thereof. For example, the i-th gate line GLi, the gate electrode portion GEP and the storage line STL may have a multi-layer structure including a titanium layer and a copper layer.

The first base substrate BS1 may be a glass substrate or a plastic substrate. A first insulating layer 10 is disposed on the one surface of the first base substrate BS1 and covers the gate electrode portion GEP and the storage line STL. The first insulating layer 10 may include at least one of an inorganic material and an organic material. In the present exemplary embodiment, the first insulating layer 10 may include an inorganic layer. For example, the first insulating layer 10 may include a silicon nitride layer, a silicon oxynitride layer, a silicon oxide layer, a titanium oxide layer, or an aluminum oxide layer.

An active pattern AP overlapping at least a portion of the gate electrode portion GEP may be disposed on the first insulating layer 10. The active pattern AP may include a semiconductor layer SCL and an ohmic contact layer OCL. The semiconductor layer SCL may be disposed on the first insulating layer 10, and the ohmic contact layer OCL may be disposed on the semiconductor layer SCL.

The semiconductor layer SCL may include amorphous silicon or polysilicon. In another embodiment, the semiconductor layer SCL may include a metal oxide semiconductor. The ohmic contact layer OCL may be doped with a higher concentration of dopants than the semiconductor layer SCL. The ohmic contact layer OCL may include two portions spaced apart from each other. In an exemplary embodiment of the present disclosure, the ohmic contact layer OCL may have an integral shape.

The first input electrode IE1 and the first output electrode OE1 are disposed on the active pattern AP. A second insulating layer 20 is disposed on the first insulating layer 10 and covers the first input electrode IE1, the first output electrode OE1, and the storage line STL. The second insulating layer 20 may include at least one of an inorganic material and an organic material. In the present exemplary embodiment, the second insulating layer 20 may include an inorganic layer. For example, the second insulating layer 20 may include a silicon nitride layer, a silicon oxynitride layer, a silicon oxide layer, a titanium oxide layer, or an aluminum oxide layer.

A color filter CF may be disposed on the second insulating layer 20. The color filter CF may include one color of red, green, and blue colors.

A third insulating layer 30 may be disposed on the color filter CF. The third insulating layer 30 may include an organic layer that provides a flat surface. The third insulating layer 30 may include an acrylic-based resin.

The first pixel electrode PXE1 and the bridge electrode BRE are disposed on the third insulating layer 30. The first pixel electrode PXE1 is connected to the first output electrode OE1 through the first contact hole CNT1 that penetrates through the second insulating layer 20, the color filter CF, and the third insulating layer 30. The bridge electrode BRE is connected to the storage line STL through the second bridge hole BRH2. A first alignment layer AL1 is disposed on the third insulating layer 30 to cover the first pixel electrode PXE1 and the bridge electrode BRE. The first alignment layer AL1 may include a polyimide resin.

A first through hole TH1 penetrates through the first insulating layer 10 to correspond to the storage line STL. A second through hole TH2 penetrates through the first insulating layer 10 to expose the first output electrode OE1, and a third through hole TH3 penetrate through the second insulating layer 20 corresponding to the first through hole TH1. A fourth through hole TH4 penetrates through the third insulating layer 30 corresponding to the second through hole TH2, and a fifth through hole TH5 penetrate through the third insulating layer 30 corresponding to the third through hole TH3. A first filter through hole CF-01 penetrates through the color filter CF corresponding to the second through hole TH2, and a second filter through hole CF-02 penetrates through the color filter CF corresponding to the third through hole TH3.

The second bridge hole BRH2 may be defined by a combination of the first through hole TH1, the third through hole TH3, the second filter through hole CF-02, and the fifth through hole TH5. The first contact hole CNT1 may be defined by a combination of the second through hole TH2, the first filter through hole CF-01, and the fourth through hole TH4.

In the exemplary embodiment of the present disclosure, the color filter CF may not be disposed in the first display substrate 100. In this case, the second bridge hole BRH2 may be defined by a combination of the first through hole TH1, the third through hole TH3, and the fifth through hole TH5 without the second filter through hole CF-02, and the first contact hole CNT1 may be defined by a combination of the second through hole TH2 and the fourth through hole TH4 without the first filter through hole CF-01.

In the present exemplary embodiment, the storage line STL and the bridge electrode BRE connected to the storage line STL may be defined as a connection structure (a connection pattern, or a connection element). The connection structure may include a first conductive pattern and a second conductive pattern that are disposed on different layers from each other. For example, the storage line STL may correspond to the first conductive pattern, and the bridge electrode BRE may correspond to the second conductive pattern.

Referring to FIGS. 5A and 5B, a light blocking pattern BM may be disposed on a lower surface of a second base substrate BS2. The light blocking pattern BM may overlap the circuit area CA in a plan view. For example, the light blocking pattern BM may overlap the data lines DLj and DLj+1 (refer to FIG. 4). The area of the light blocking pattern BM overlapping the data lines DLj and DLj+1 (refer to FIG. 4) may be disposed between the pixels PX (refer to FIG. 2) adjacent to each other in the first direction DR1 and may be defined as a boundary area.

The second base substrate BS2 may be a glass substrate or a plastic substrate. One or more insulating layers may be disposed on a lower surface of the second base substrate BS2 to cover the light blocking pattern BM. FIGS. 5A and 5B show a fourth insulating layer 40 that provides a flat surface as a representative example. The fourth insulating layer 40 may be an organic layer.

A common electrode CE may be disposed on a lower surface of the fourth insulating layer 40. The common voltage Vcom may be applied to the common electrode CE. The common voltage Vcom and the pixel voltage may have different voltage levels from each other. A second alignment layer AL2 may be disposed on a lower surface of the common electrode CE.

It is noted that the cross-section of the pixel PXij shown in FIGS. 5A and 5B is merely exemplary. For example, the first display substrate 100 and the second display substrate 200 may be upside down in the third direction DR3.

In the above descriptions, a vertical alignment (VA) mode liquid crystal display panel has been described as a representative example of the display panel DP, however, according to other embodiments, an in-plane switching (IPS) mode, fringe-field switching (FFS) mode, or plane to line switching (PLS) mode liquid crystal display panel may be applied to the display panel DP without deviating from the scope of the present disclosure.

Figure 6A:
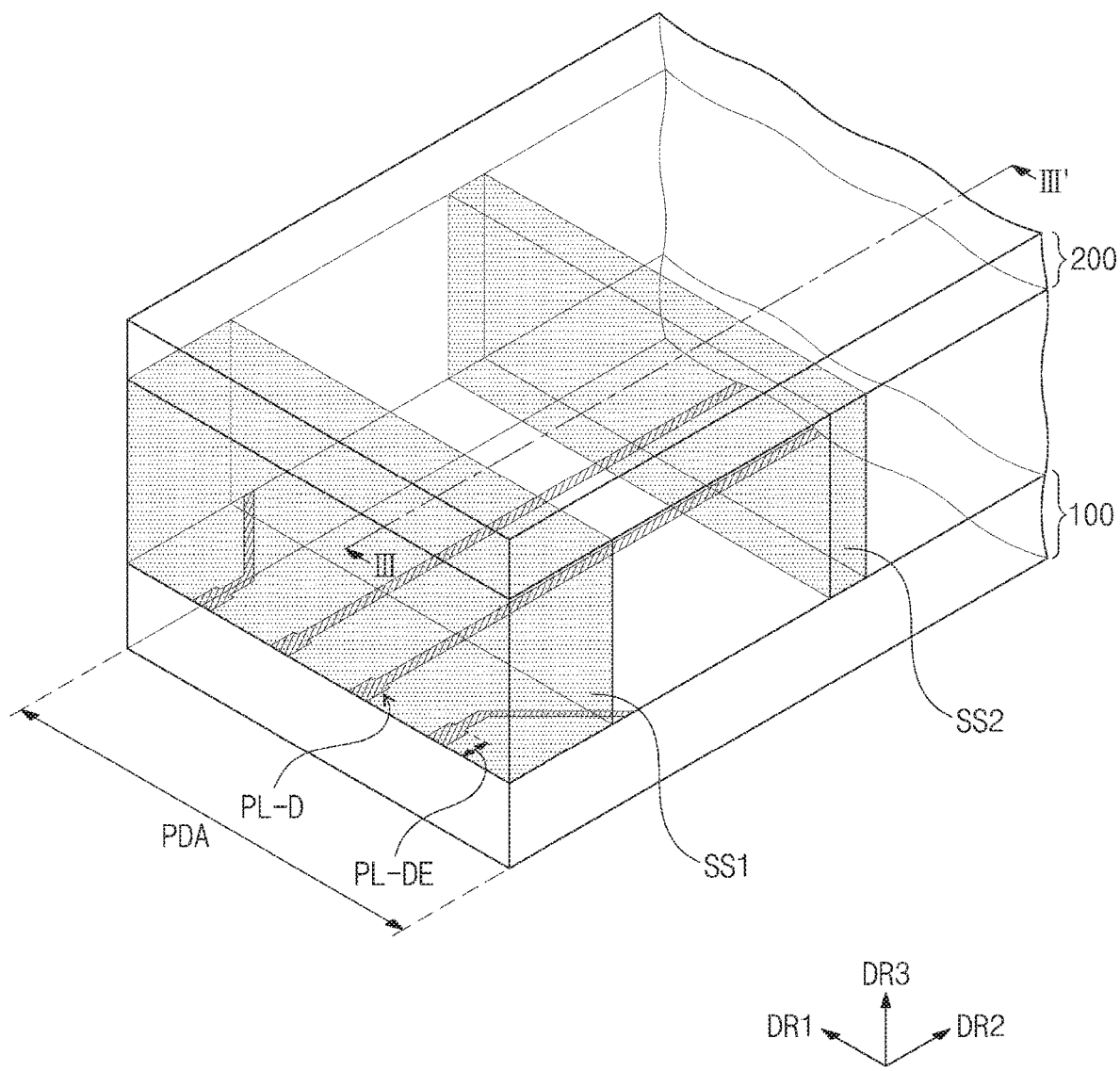
FIG. 6A is a perspective view showing a pad area of a display panel according to an exemplary embodiment of the present disclosure.
Figure 6B:
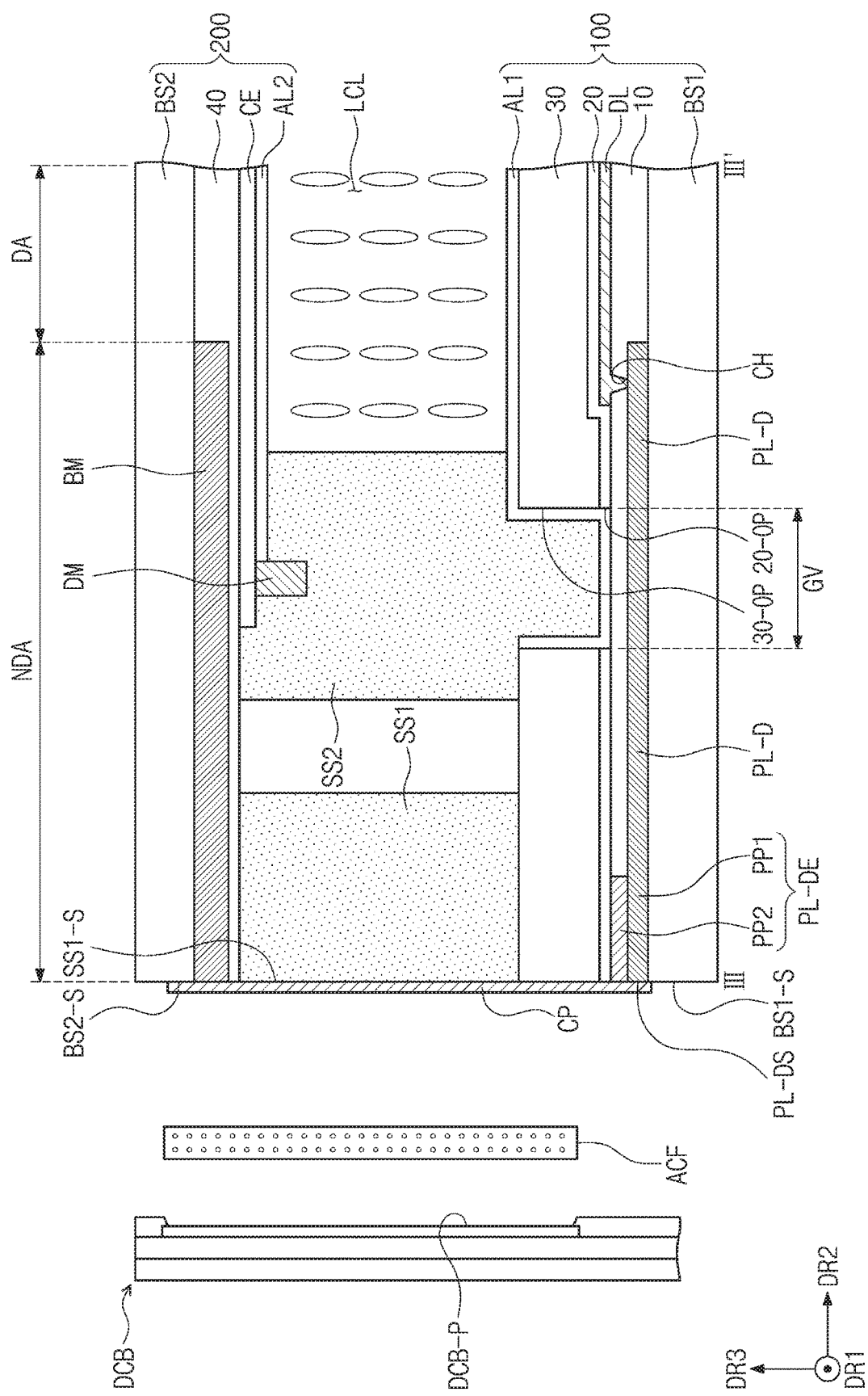
FIG. 6B is a cross-sectional view taken along a line III-III' of FIG. 6A.

FIG. 6A is a perspective view showing a pad area PDA of a display panel DP according to an exemplary embodiment of the present disclosure. FIG. 6B is a cross-sectional view taken along a line III-III' of FIG. 6A.

In the present exemplary embodiment, a display device DD including a first sealant SS1 and a second sealant SS2 is shown as a representative example, however, it should not be limited thereto or thereby. The display device DD may include one sealant. Each of the first sealant SS1 and the second sealant SS2 may extend along the edge DP-E (refer to FIG. 2) of the display panel DP in a plan view and may have a closed-line shape.

The first sealant SS1 and the second sealant SS2 may include a synthetic resin and inorganic fillers mixed with the synthetic resin. One of the first sealant SS1 and the second sealant SS2 may further include conductive particles. The synthetic resin may further include other additives. The additives may include an amine-based curing agent and a photoinitiator. The additives may further include a silane-based additive and an acrylic-based additive.

As shown in FIGS. 6A and 6B, an end portion PL-DE of the auxiliary signal line PL-D may overlap the pad area PDA. The end portion PL-DE of the auxiliary signal line PL-D may be defined as a portion of the auxiliary signal line PL-D and overlaps the first sealant SS1. The end portion PL-DE may be defined as whole or a portion of the auxiliary signal line PL-D that overlaps the first sealant SS1.

A side surface PL-DS of the auxiliary signal line PL-D may be substantially aligned with a side surface BS1-S of the first base substrate BS1. A side surface SS1-S of the first sealant SS1 may be substantially aligned with the side surface BS1-S of the first base substrate BS1. The side surface BS1-S of the first base substrate BS1 may be substantially aligned with a side surface BS2-S of the second base substrate BS2.

The connection pad CP is disposed on the side surface of the display panel DP. In detail, the connection pad CP may be coupled to at least the side surface BS1-S of the first base substrate BS1, the side surface SS1-S of the first sealant SS1, and the side surface BS2-S of the second base substrate BS2. The connection pad CP may not make contact with the side surface BS2-S of the second base substrate BS2 by adjusting a length in the third direction DR3 of the connection pad CP.

The end portion PL-DE of the auxiliary signal line PL-D may be defined as a signal pad. The signal pad may include a first pad PP1 and a second pad PP2 directly disposed on the first pad PP1. The first pad PP1 may be a portion of the auxiliary signal line PL-D. The second pad PP2 may be a conductive pattern and may be formed through the same processes as the input electrode IE1 (refer to FIG. 5A). The first insulating layer 10 may expose the first pad PP1. The second pad PP2 may be exposed without being covered by the first insulating layer 10. A portion of the second pad PP2 may be disposed on the first insulating layer 10. The second insulating layer 20 may cover the second pad PP2.

The connection pad CP may be connected to the end portion PL-DE of the auxiliary signal line PL-D. The connection pad CP may be provided in a plural number, and the connection pads CP may be connected to the side surfaces PL-DS of the end portions PL-DE in a one-to-one correspondence. The connection pad CP may be electrically connected to a pad DCB-P of the circuit board DCB through an anisotropic conductive film ACF. The anisotropic conductive film ACF may be replaced with a solder paste, and the connection pad CP may be directly connected to the pad DCB-P of the circuit board DCB.

The connection pad CP is disposed on the side surface of the display panel DP, and the circuit board DCB may be connected to the side surface of the display panel DP. Since the area where the circuit board DCB is connected to the display panel DP is connected to the side surface of the display panel DP, a size of the non-display area NDA may be reduced.

Referring to FIG. 6B, a groove GV is formed in the non-display area NDA. The groove GV may extend along the edge DP-E (refer to FIG. 2) of the display panel DP. The groove GV may have a closed-line shape or may include a plurality of portions.

The groove GV may be defined by a first opening 30-OP that penetrates through at least a portion of the third insulating layer 30. In a case where a second opening 20-OP is formed to penetrate through the second insulating layer 20 to correspond to the first opening 30-OP, the groove GV may become deep. A portion of the first insulating layer 10 may be exposed through the groove GV.

The groove GV may be disposed in the end portion PL-DE to be closer to the display area DA than the end portion PL-DE. The groove GV may overlap the second sealant SS2.

A portion of the first alignment layer AL1 may be disposed in the groove GV. Substantially, an end portion of the first alignment layer AL1 may be disposed in the groove GV. The end portion of the first alignment layer AL1 may be controlled by the groove GV. This will be described in detail with reference to FIGS. 7A to 7G.

As the end portion of the first alignment layer AL1 is controlled by the groove GV, a coupling area between the first sealant SS1 and the second sealant SS2 may increase. The coupling area corresponds to a size of the area that does not overlap the first alignment layer AL1. The first alignment layer AL1 may have a lower coupling strength with respect to the first sealant SS1 or the second sealant SS2 than that with respect to the first, second, and third insulating layers 10 to 30.

A dam DM may be disposed in the second display substrate 200 to control the end portion of the second alignment layer AL2. The dam DM may overlap the second sealant SS2. A location of the dam DM may not be particularly limited.

FIGS. 7A to 7G are cross-sectional views showing a method of manufacturing the display substrate according to an exemplary embodiment of the present disclosure. The display substrate may be the first display substrate 100 of FIGS. 5A and 5B. Hereinafter, detailed descriptions of the same configurations as those described with reference to FIGS. 5A to 6B will be omitted.

Referring to FIG. 7A, the signal line PL-D, the gate electrode portion GEP, and the storage line STL are formed on the base substrate BS1. The signal line PL-D may be the auxiliary signal line PL-D of FIG. 2. After the base substrate BS1 including the display area DA and the non-display area NDA is provided, a process of forming a conductive layer and a photolithography process of patterning the conductive layer may be performed.

The first insulating layer 10 is formed on the base substrate BS1 to cover the signal line PL-D and the gate electrode portion GEP. A process of depositing the inorganic material or the organic material may be performed to form the first insulating layer 10. In the present exemplary embodiment, the first insulating layer 10 may be the inorganic layer.

A photoresist layer PR is disposed on the first insulating layer 10. A first opening PR-01 and a second opening PR-02 are formed through the photoresist layer PR. The first opening PR-01 overlaps the storage line STL, and the second opening PR-02 corresponds to the first pad PP1. The first insulating layer 10 is etched using the photoresist layer PR as a mask.

Referring to FIG. 7B, a first opening area 10-0 through which the first pad PP1 is exposed and the through hole TH1 through which the storage line STL is exposed are formed.

Figure 7C:
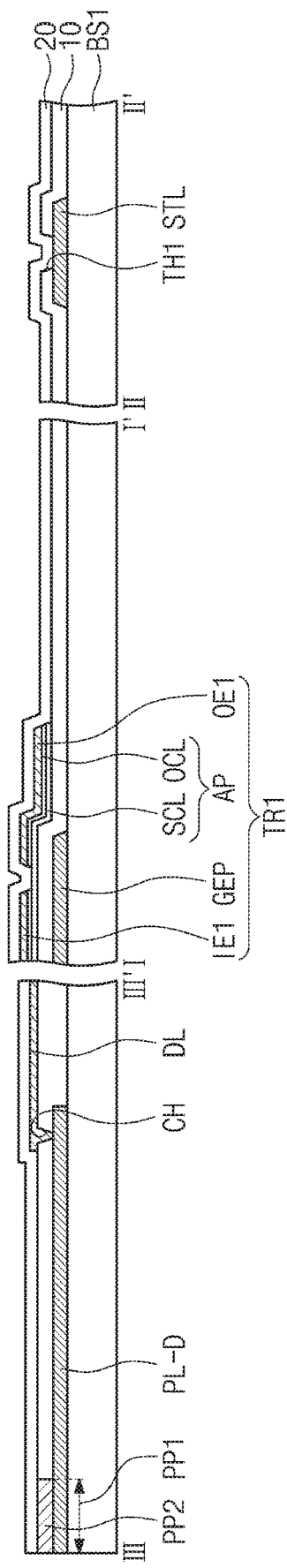

Referring to FIG. 7C, a semiconductor material may be deposited on the first insulating layer 10, and a photolithography process may be performed on the semiconductor material to form the semiconductor layer SCL and the ohmic contact layer OCL. In addition, a conductive material may be deposited on the first insulating layer 10, and a photolithography process may be performed on the conductive material to form the second pad PP2, the data line DL, the input electrode IE1, and the output electrode OE1. The contact hole CH may be formed through the first insulating layer 10 before the data line DL is formed.

The second insulating layer 20 is formed on the first insulating layer 10 to cover the second pad PP2, the data line DL, the input electrode IE1, and the output electrode OE1. A process of depositing an inorganic material or an organic material may be performed to form the second insulating layer 20. In the present exemplary embodiment, the second insulating layer 20 may be an inorganic layer.

Figure 7D:
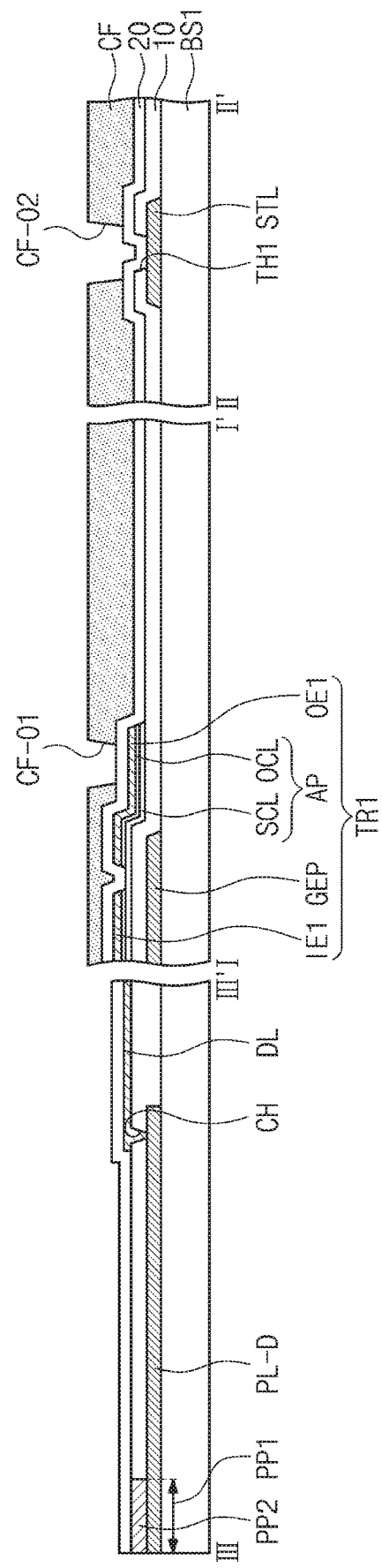

Referring to FIG. 7D, the color filter CF may be formed. An organic material may be deposited, and a photolithography process may be performed on the organic material to form the color filter CF through which the first filter through hole CF-01 (sixth through hole) and the second filter through hole CF-02 (seventh through hole) are defined. The process of forming the color filter may be omitted in a case where the display substrate does not include the color filter CF.

Referring to FIG. 7E, the third insulating layer 30 may be formed on the second insulating layer 20 to cover the color filter CF. In the present exemplary embodiment, the third insulating layer 30 may be an organic layer.

As described with reference to FIG. 7A, the first opening 30-OP, the fourth through hole TH4, and the fifth through hole TH5 may be formed through the third insulating layer 30 using the photoresist layer PR as a mask. Each of the fourth through hole TH4 and the fifth through hole TH5 exposes a portion of the second insulating layer 20. Three opening areas may be formed through the third insulating layer 30 through a single photolithography process.

Figure 7F:
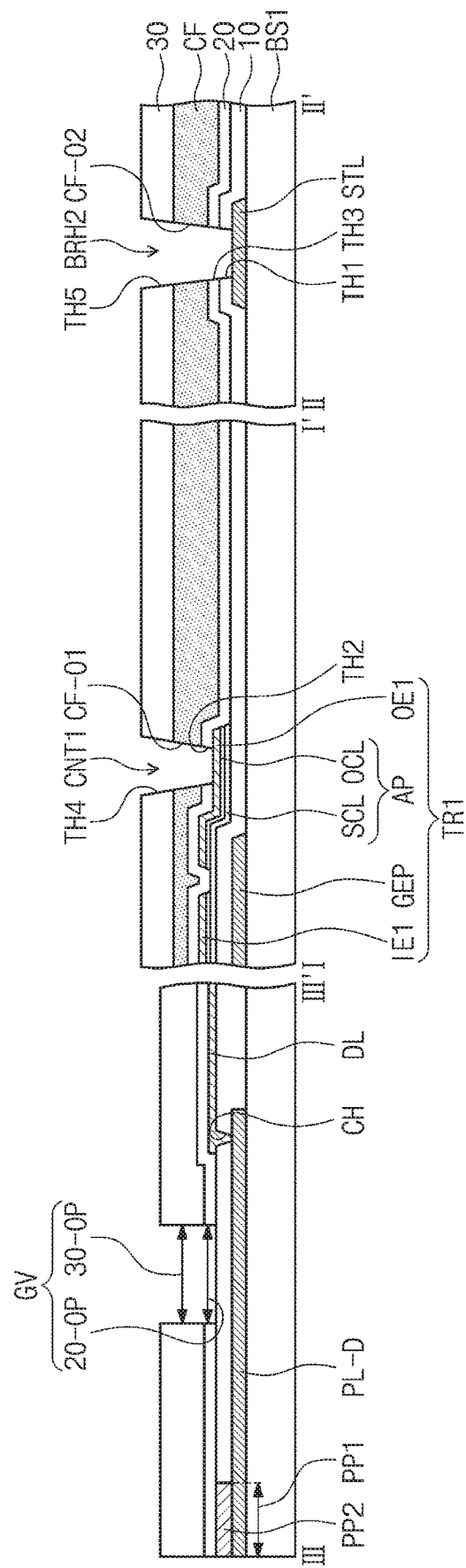

Referring to FIG. 7F, the second insulating layer 20 may be etched using the patterned third insulating layer 30 as a mask. The second opening 20-OP, the second through hole TH2, and the third through hole TH3 are formed through the second insulating layer 20. The groove GV including the first opening 30-OP and the second opening 20-OP is defined on the base substrate BS1.

Figure 7G:
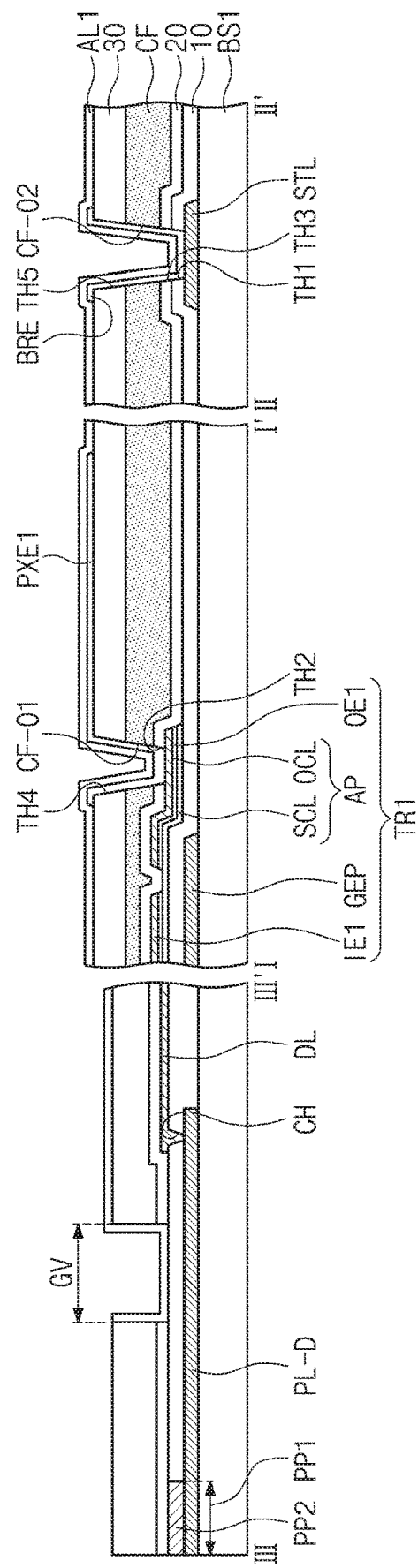

Referring to FIG. 7G, the first pixel electrode PXE1 and the bridge electrode BRE are formed on the third insulating layer 30. A conductive material may be deposited, and a photolithography process may be performed to form the first pixel electrode PXE1 and the bridge electrode BRE.

The alignment layer AL1 is formed on the third insulating layer 30. A liquid alignment material is provided on the third insulating layer 30. The liquid alignment material spreads to an edge area of the base substrate BS1 on the third insulating layer 30. The movement of the liquid alignment material may be limited by the groove GV. A liquid preliminary alignment layer may be applied and dried to form the alignment layer AL1. The end portion of the alignment layer AL1 is disposed in the groove GV.

The first display substrate 100 may be formed in the above-described manner, the second display substrate 200 may be formed separately from the first display substrate 100. Then, the second display substrate 200 may be bonded to the first display substrate 100 using the sealant (e.g., the first sealant SS1, the second sealant SS2). A process of forming the liquid crystal layer may be performed before or after the bonding process.

Figure 8A:
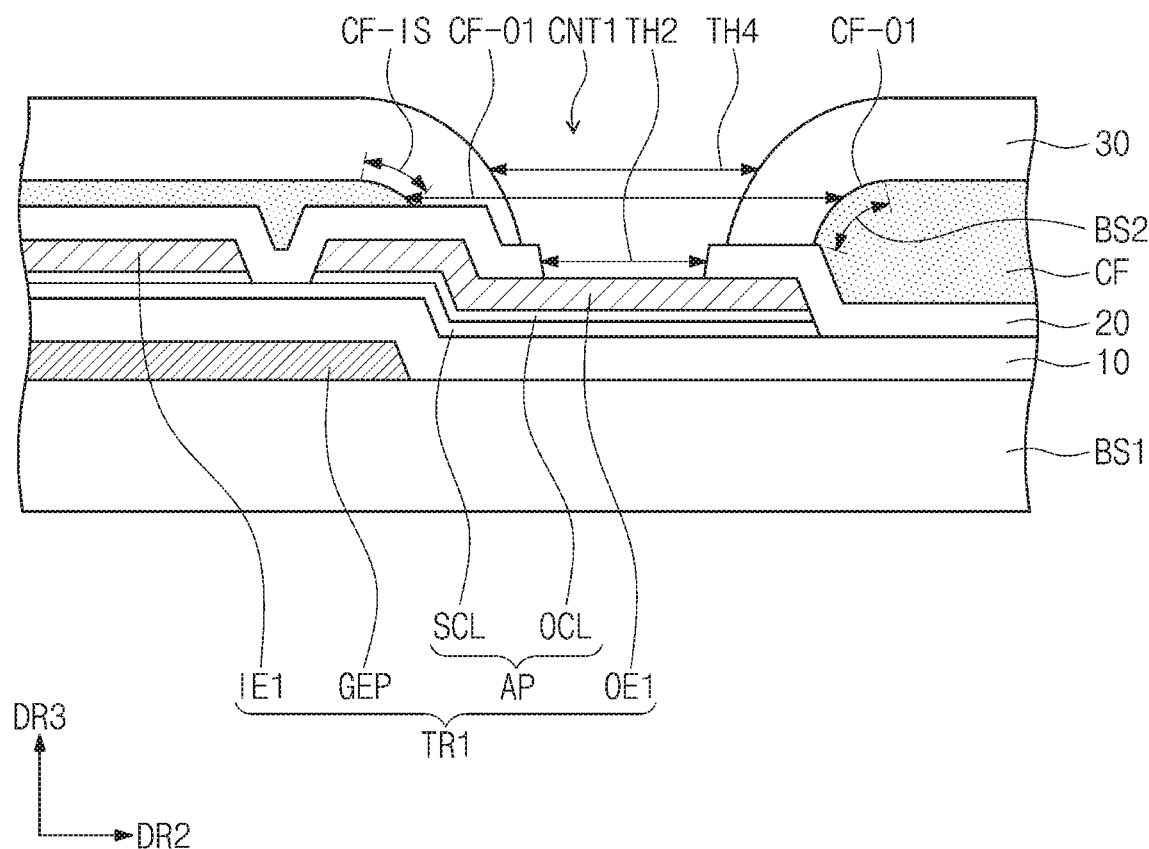
FIGS. 8A, 8B, and 8C are enlarged cross-sectional views showing a display substrate according to an exemplary embodiment of the present disclosure.
Figure 8B:
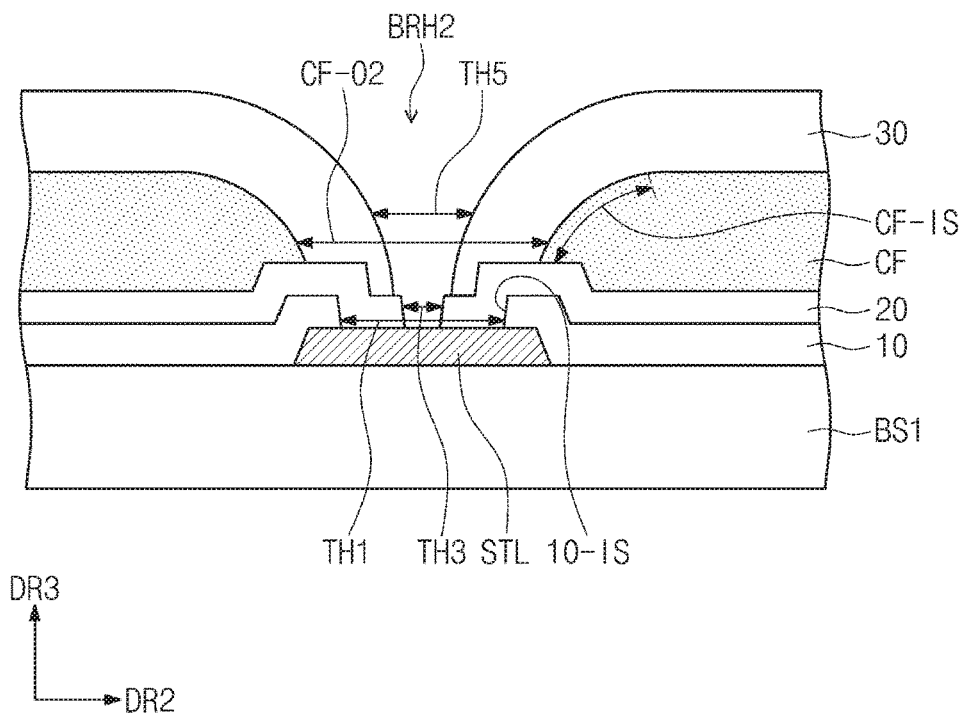
Figure 8C:
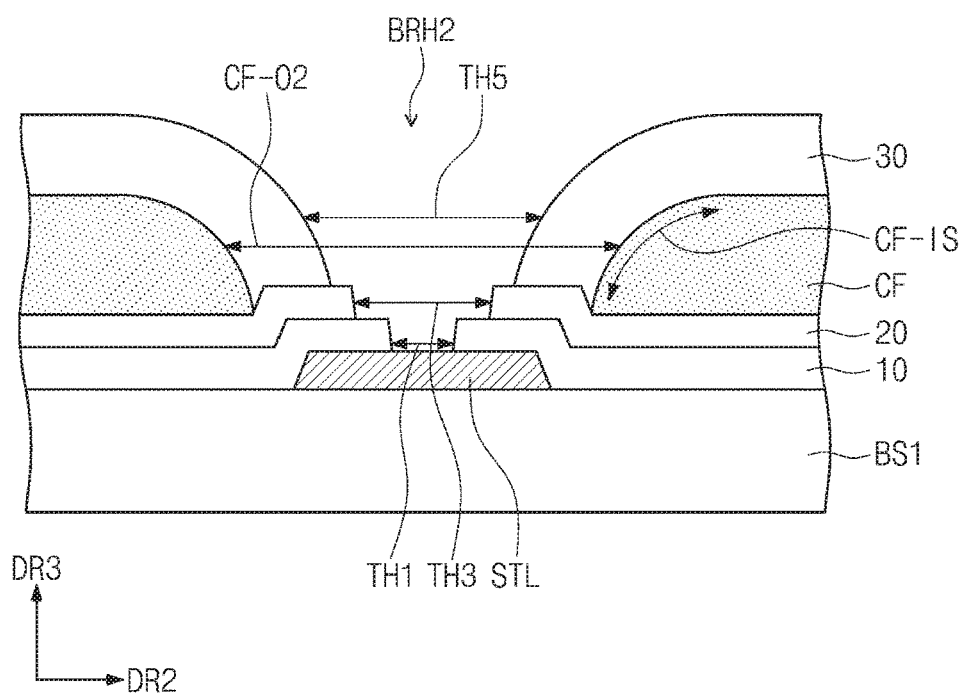

FIGS. 8A to 8C are enlarged cross-sectional views showing the first display substrate 100 according to an exemplary embodiment of the present disclosure. For example, FIGS. 8A to 8C are enlarged views showing a portion of the first display substrate 100 shown in FIG. 5A or 5B.

Referring to FIG. 8A, an inner side surface area CF-IS of the color filter CF that defines the first filter through hole CF-01 may be covered by the third insulating layer 30. In FIG. 5A, the inner side surface area of the color filter CF is shown as forming one inclined surface with inner side surface areas of the second and third insulating layers 20 and 30. The structure of the area in which the first contact hole CNT1 is defined may be changed by adjusting a size of the through hole as shown in FIG. 5A or FIG. 8A.

In this case, a portion of an upper surface of the second insulating layer 20 that corresponds to the fourth through hole TH4 may be exposed without being covered by the third insulating layer 30. As shown in FIG. 8A, the shortest length in the second direction DR2 of the fourth through hole TH4 is greater than the shortest length in the second direction DR2 of the second through hole TH2.

Referring to FIGS. 8B and 8C, a portion of the upper surface of the second insulating layer 20 that corresponds to the fifth through hole TH5 may be exposed without being covered by the third insulating layer 30. As shown in FIGS. 8B and 8C, the shortest length in the second direction DR2 of the fifth through hole TH5 is greater than the shortest length in the second direction DR2 of the third through hole TH3.

As shown in FIG. 8B, an inner side surface area 10-IS of the first insulating layer 10 that defines the first through hole TH1 may be covered by the second insulating layer 20. As shown in FIG. 8B, the shortest length in the second direction DR2 of the third through hole TH3 is smaller than the shortest length in the second direction DR2 of the first through hole TH1.

As shown in FIG. 8C, a portion of the upper surface of the first insulating layer 10 that corresponds to the third through hole TH3 may be exposed without being covered by the second insulating layer 20. As shown in FIG. 8C, the shortest length in the second direction DR2 of the third through hole TH3 is greater than the shortest length in the second direction DR2 of the first through hole TH1.

In FIG. 5B, the inner side surface area of the color filter CF is shown as forming one inclined surface with inner side surface areas of the second and third insulating layers 20 and 30. The structure of the area in which the second bridge hole BRH2 is defined may be changed by adjusting a size of the through holes as shown in FIG. 5B, FIG. 8B, or FIG. 8C.

Figure 9:
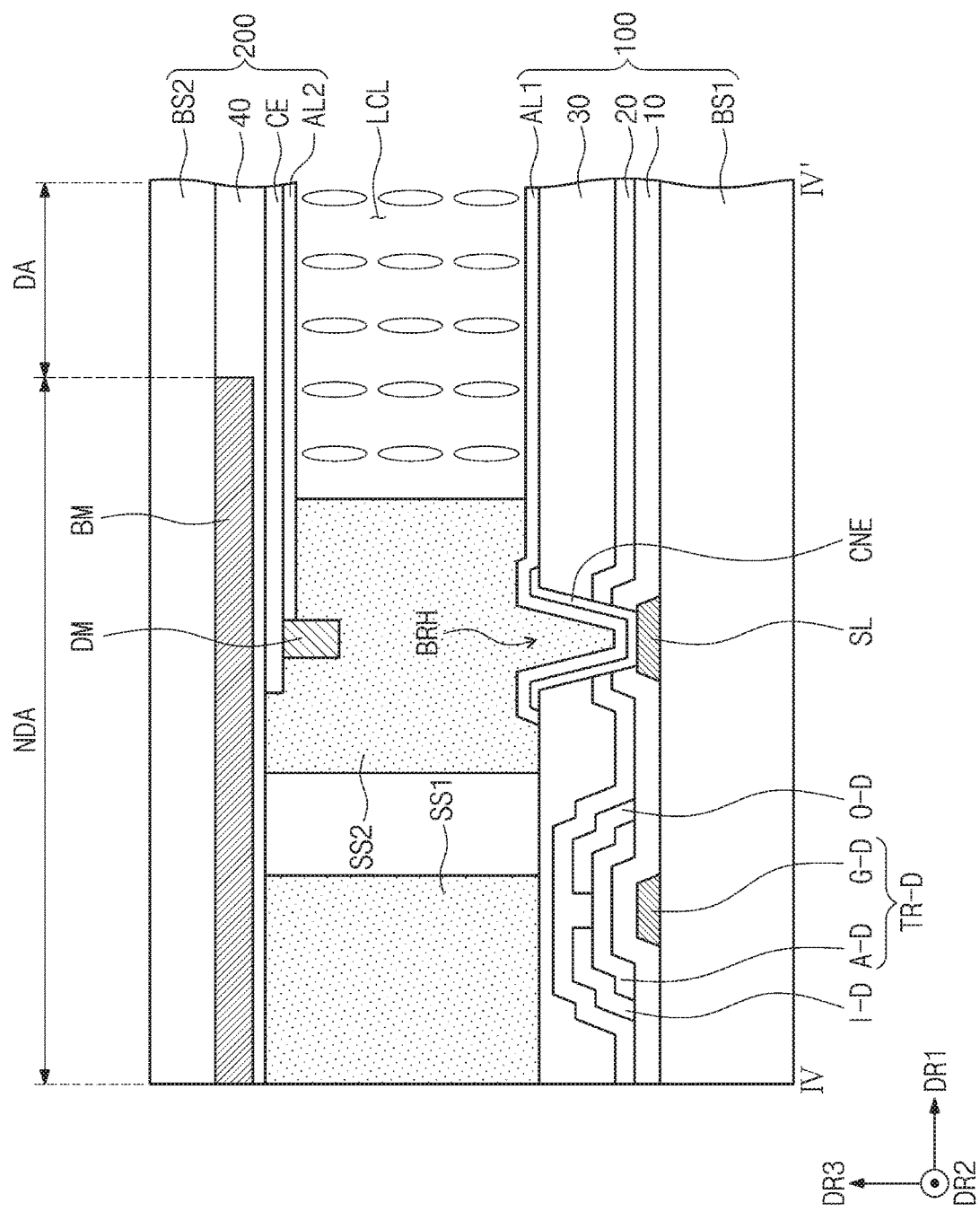
FIG. 9 is a cross-sectional view showing a display panel according to an exemplary embodiment of the present disclosure.

FIG. 9 is a cross-sectional view showing a display panel DP according to an exemplary embodiment of the present disclosure. FIG. 9 shows the cross-sectional view taken along a ling IV-IV' of FIG. 2.

In FIG. 9, a connection structure different from the connection structure shown in FIG. 5B is shown. According to the present exemplary embodiment, the connection structure may form a portion of the gate driving circuit GDC. The gate driving circuit GDC may include a driving transistor TR-D formed through the same process as the first transistor TR1 of FIG. 5A. The driving transistor TR-D may include a control electrode G-D, an active pattern A-D, an input electrode I-D, and an output electrode O-D. The driving transistor TR-D may include a signal line SL and a connection electrode CNE. In FIG. 9, one driving transistor is shown as a representative example.

In the present exemplary, the signal line SL and the connection electrode CNE may be defined as the connection structure. The signal line SL may receive a clock signal or a bias voltage. The connection electrode CNE may connect the signal line SL to another signal line or may connect the signal line SL to the driving transistor TR-D.

A bridge hole BRH (or the structure of the area in which the bridge hole BRH is formed) shown in FIG. 9 may have substantially the same structure as one of the second bridge holes BRH2 (or a structure in which the second bridge hole BRH2 is formed) shown in FIG. 5B, FIG. 8B, and FIG. 8C.

Figure 10A:
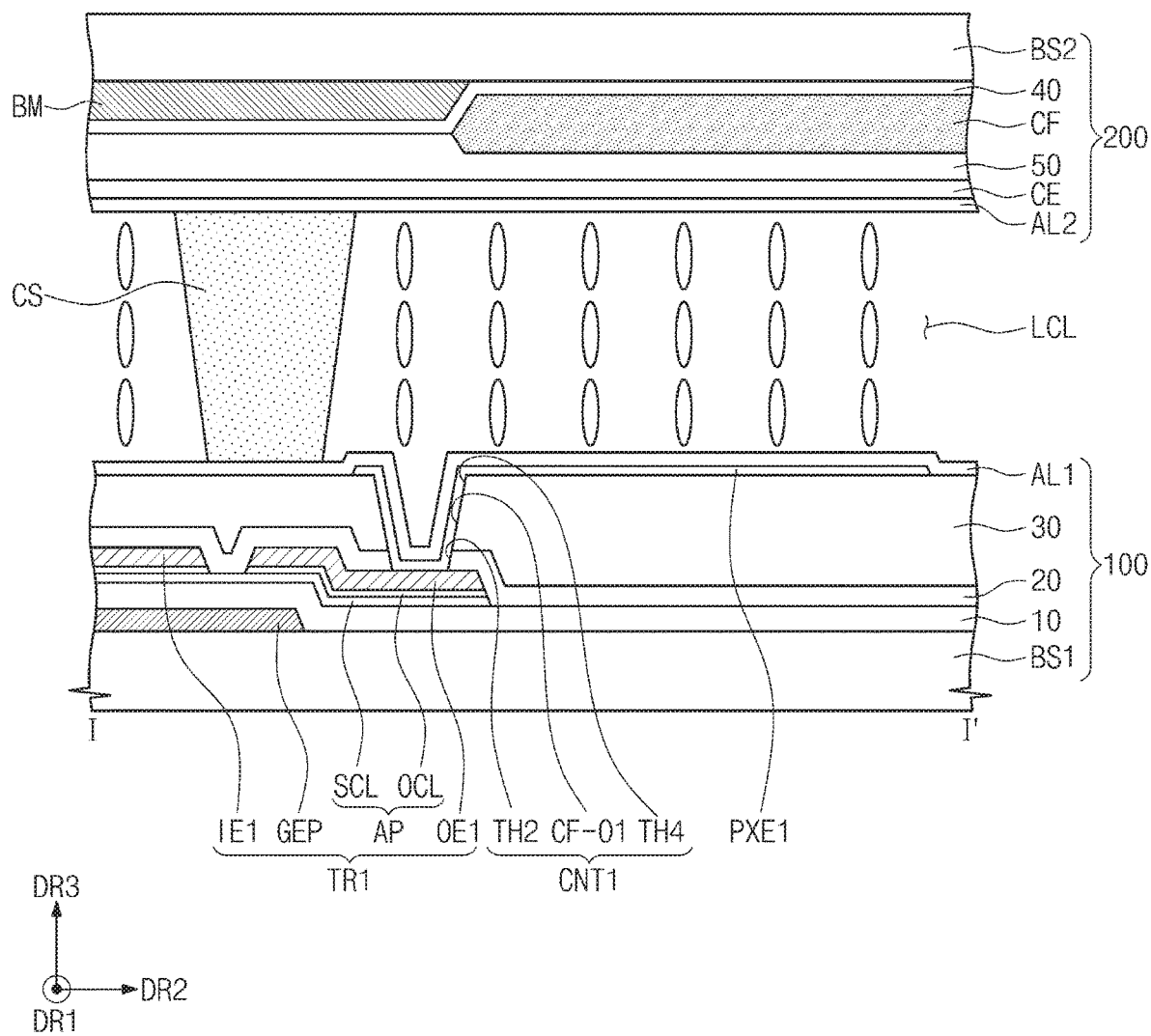
FIGS. 10A and 10B are cross-sectional views showing a display panel according to an exemplary embodiment of the present disclosure.
Figure 10B:
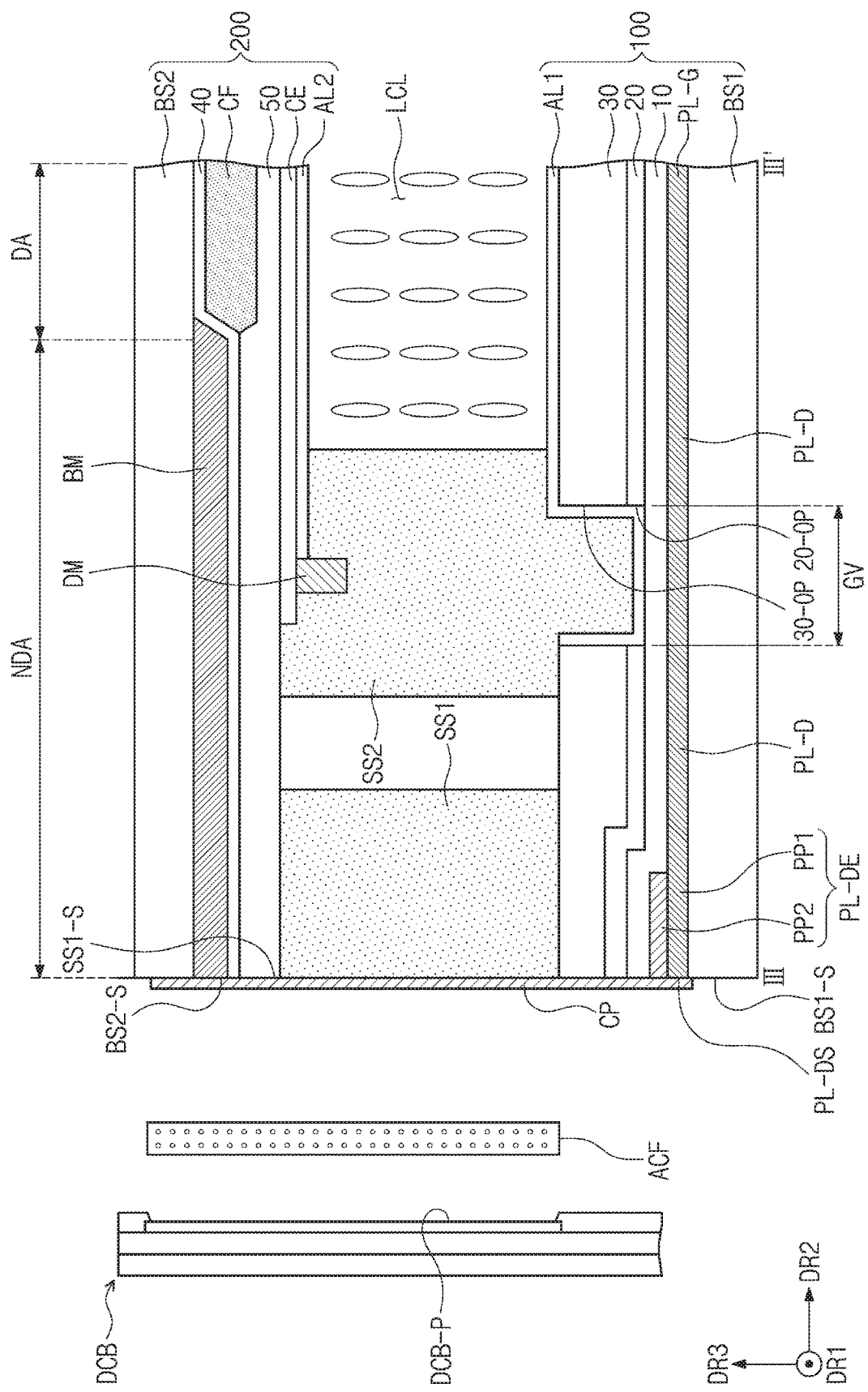

FIGS. 10A and 10B are cross-sectional views showing a display panel DP according to an exemplary embodiment of the present disclosure. For example, FIGS. 10A and 10B respectively correspond to FIGS. 5A and 6B.

According to the present exemplary embodiment, a color filter CF is disposed on a second display substrate 200 as opposed to being disposed on a first display substrate 100. A portion of the third insulating layer 30 that overlaps the first pixel electrode PXE1 is disposed directly on the second insulating layer 20.

A first contact hole CNT1 may be defined by a combination of a second through hole TH2 and a fourth through hole TH4. Although not shown separately, a second bridge hole BRH2 may be defined by a combination of a first through hole TH1, a third through hole TH3, and a fifth through hole TH5.

Although the exemplary embodiments of the present disclosure have been described, it is understood that the present disclosure should not be limited to these exemplary embodiments, and various changes and modifications can be made by one ordinary skilled in the art within the spirit and scope of the present disclosure as hereinafter claimed.

Therefore, the disclosed subject matter should not be limited to any embodiment described herein, and the scope of the present inventive concept shall be determined according to the attached claims.

What is claimed is:

1. A display substrate comprising:
   a base substrate comprising a display area and a non-display area;
   a pixel electrode disposed on the base substrate and overlapping the display area;
   a first transistor connected to the pixel electrode and comprising an input part, an output part, and a control part;
   a signal pad disposed on the base substrate, overlapping the non-display area, and comprising a first pad and a second pad disposed on the first pad;
   a connection structure overlapping the display area and comprising a first conductive pattern that is disposed on a same layer as the control part and a second conductive pattern that is disposed on a same layer as the pixel electrode;
   a first inorganic layer disposed on the control part comprising a first through hole, that exposes at least a portion of the first conductive pattern, and the first inorganic layer exposing the signal pad;
   a second inorganic layer disposed on the first inorganic layer, covering the input part, the output part, and the second pad, and comprising a second through hole that exposes at least a portion of the output part and a third through hole that corresponds to the first through hole;
   an organic layer disposed on the second inorganic layer and comprising a first opening that overlaps the non-display area, a fourth through hole that corresponds to the second through hole, and a fifth through hole that corresponds to the third through hole; and
   an alignment layer covering the pixel electrode and the second conductive pattern and partially disposed in the first opening,
   wherein the pixel electrode is connected to the output part through the second through hole and the fourth through hole, and the second conductive pattern is connected to the first conductive pattern through the first through hole, the third through hole, and the fifth through hole.

2. The display substrate of claim 1, wherein the second inorganic layer comprises a second opening that corresponds to the first opening.

3. The display substrate of claim 2, wherein the first opening and the second opening extend along an edge of the display substrate.

4. The display substrate of claim 1, further comprising a color filter disposed between the second inorganic layer and the organic layer and overlapping the pixel electrode,
   wherein the color filter comprises a sixth through hole that corresponds to the fourth through hole and a seventh through hole that corresponds to the fifth through hole.

5. The display substrate of claim 4, wherein the organic layer may cover an inner side surface area of the color filter that correspond to the sixth through hole.

6. The display substrate of claim 1, wherein the first pad corresponds to a portion of a signal line that is connected to the first transistor.

7. The display substrate of claim 1, further comprising:
a second transistor connecting the first transistor to the connection structure; and
a third transistor connected to the first transistor,
wherein the first transistor and the third transistor are connected to a signal line, the pixel electrode comprises a first sub-electrode connected to the first transistor and a second sub-electrode connected to the third transistor, and the first conductive pattern receives a storage voltage.

8. The display substrate of claim 1, wherein the organic layer exposes a portion of an upper surface of the second inorganic layer that corresponds to the fourth through hole.

9. The display substrate of claim 1, wherein the organic layer exposes a portion of an upper surface of the second inorganic layer that corresponds to the fifth through hole.

10. The display substrate of claim 9, wherein the second inorganic layer covers an inner side surface area of the first inorganic layer that corresponds to the first through hole.

11. The display substrate of claim 9, wherein the second inorganic layer exposes a portion of an upper surface of the first inorganic layer that corresponds to the third through hole.

12. The display substrate of claim 1, further comprising a driving circuit disposed on the base substrate and overlapping the non-display area, wherein the connection structure corresponds to a portion of the driving circuit.

13. A display device comprising:
a first display substrate;
a connection pad disposed on a side surface of the first display substrate; and
a circuit board coupled to the connection pad,
the first display substrate comprising:
a first base substrate comprising a display area and a non-display area;
a pixel electrode disposed on the first base substrate and overlapping the display area;
a transistor connected to the pixel electrode and comprising an input part, an output part, and a control part;
a signal pad disposed on the first base substrate, overlapping the non-display area, comprising a first pad and a second pad disposed on the first pad, and connected to the connection pad;
a connection structure overlapping the display area and comprising a first conductive pattern that is disposed on a same layer as the control part and a second conductive pattern that is disposed on a same layer as the pixel electrode;
a first inorganic layer disposed on the control part comprising a first through hole that exposes at least a portion of the first conductive pattern, and the first inorganic layer further exposing the signal pad;
a second inorganic layer disposed on the first inorganic layer, covering the input part, the output part, and the second pad, and comprising a second through hole that exposes at least a portion of the output part and a third through hole that corresponds to the first through hole;
an organic layer disposed on the second inorganic layer and comprising a fourth through hole that corresponds to the second through hole, and a fifth through hole that corresponds to the third through hole; and
an alignment layer covering the pixel electrode and the second conductive pattern,
wherein a removed at least a portion of the organic layer is defined in the non-display area of the first display substrate, a portion of the alignment layer is disposed in the groove, the pixel electrode is connected to the output part through the second through hole and the fourth through hole, and the second conductive pattern is connected to the first conductive pattern through the first through hole, the third through hole, and the fifth through hole.

14. The display device of claim 13, wherein the groove is extended to a portion of the second inorganic layer to expose at least a portion of the first inorganic layer.

15. The display device of claim 13, further comprising a second display substrate facing the first display substrate, wherein the second display substrate comprises a second base substrate and a common electrode disposed on the second base substrate.

16. The display device of claim 15, further comprising a color filter disposed on the first base substrate or the second base substrate.

17. The display device of claim 16, wherein the color filter is disposed between the second base substrate and the common electrode.

18. The display device of claim 13, further comprising a second display substrate facing the first display substrate and a sealant coupling the first display substrate and the second display substrate, wherein the sealant overlaps the groove.

19. The display device of claim 13, wherein a portion of the organic layer that overlaps the pixel electrode is disposed on the second inorganic layer.

* * * * *